US00RE38464E

(19) United States
(12) Reissued Patent
Kusase et al.

(10) Patent Number: US RE38,464 E
(45) Date of Reissued Patent: Mar. 16, 2004

(54) ALTERNATING CURRENT GENERATOR HAVING A PLURALITY OF INDEPENDENT THREE-PHASE WINDINGS

(75) Inventors: Sin Kusase, Obu (JP); Keiichiro Banzai, Toyota (JP); Seiji Hayashi, Anjo (JP)

(73) Assignee: Nippondenso Co., Ltd., Kariya

(21) Appl. No.: 10/197,833

(22) Filed: Jul. 19, 2002

Related U.S. Patent Documents

Reissue of:
(64) Patent No.: 5,122,705
Issued: Jun. 16, 1992
Appl. No.: 07/689,343
Filed: Apr. 24, 1991

(30) Foreign Application Priority Data

Apr. 24, 1990 (JP) ..... 2-108228
May 17, 1990 (JP) ..... 2-127559
Jul. 18, 1990 (JP) ..... 2-190096

(51) Int. Cl.[7] ..... H02K 11/00; H02K 3/28; H02K 1/22; H02K 19/26

(52) U.S. Cl. ..... 310/68 D; 310/180; 310/198; 310/263

(58) Field of Search ..... 310/68 D, 111, 310/179, 180, 185, 184, 206, 207, 198, 263

(56) References Cited

U.S. PATENT DOCUMENTS

| | | | | |
|---|---|---|---|---|
| 876,568 | A | 1/1908 | Lord | 310/63 |
| 3,396,324 | A | 8/1968 | Karlsson et al. | 363/102 |
| 3,527,970 | A | 9/1970 | Wightman et al. | 310/63 |
| 3,953,753 | A | 4/1976 | Barrett | 310/168 |
| 4,162,419 | A | 7/1979 | DeAngelis | 310/266 |
| 4,201,930 | A | 5/1980 | Inageki et al. | 310/51 |
| 4,263,526 | A | 4/1981 | Taguchi et al. | 310/263 |
| 4,340,849 | A | 7/1982 | Kuhn | 322/28 |
| 4,356,418 | A | 10/1982 | Stroud | 310/184 |
| 4,409,507 | A | 10/1983 | Godwin | 310/205 |
| 4,617,485 | A | 10/1986 | Nakamura et al. | 310/65 |

FOREIGN PATENT DOCUMENTS

| | | | |
|---|---|---|---|
| DE | 911288 | 5/1954 | H02K/3/28 |
| DE | 1291012 | 3/1969 | |
| DE | 2234070 | 2/1973 | |
| DE | 2830883 | 1/1979 | H02K/3/28 |
| GB | 684745 | 12/1952 | |
| GB | 1 257 195 | 12/1971 | H02K/3/28 |
| JP | 63-17562 | 2/1968 | H02K/19/16 |
| JP | A-51-87705 | 7/1976 | H02K/19/24 |
| JP | A-57-122657 | 7/1982 | H02K/19/22 |
| JP | 57-122657 | 7/1982 | H02K/19/22 |
| JP | 57-122699 | 7/1982 | H02P/9/00 |
| JP | U-59-179500 | 11/1984 | H02P/9/48 |
| JP | 59-179500 | 11/1984 | H02P/9/48 |
| JP | 60-22500 | 2/1985 | H02P/9/30 |
| JP | 60-204240 | 10/1985 | H02K/9/06 |
| JP | B2-62-33818 | 7/1987 | H02I/7/24 |
| JP | 62-145471 | 9/1987 | H02K/19/26 |
| JP | A-63-92243 | 4/1988 | H02K/19/28 |
| JP | 63-92243 | 4/1988 | H02K/3/28 |

*Primary Examiner*—Karl Tamai
(74) *Attorney, Agent, or Firm*—Oliff & Berridge, PLC

(57) ABSTRACT

There is provided an alternating current generator comprising: a rotatably supported field rotor having a pair of opposed rotor pole cores, each being provided with P/2 claw poles wherein P is an even number, and a field winding wound on the rotor pole cores; an armature core located around the outer periphery of the field rotor and having axially extending 3nP slots wherein n is an integer more than one; n independent sets of three-phase windings, each being wound on the armature core by being inserted in the slots so that the n sets of three-phase windings are shifted from each other by electrical angle of $\pi/(3n)$ radians; and three-phase rectifiers connected with the n sets of three-phase windings to rectify output voltages generated by the three-phase windings.

29 Claims, 18 Drawing Sheets

ROTATIONAL DIRECTION OF ROTOR

ELECTRICAL ANGLE π(rad)
π/6
SLN
n-2 n-1 n 1 2 3 4 5 6 7 8 9 10 11 12 13 14 15 16 17 18 19 20 21 22 23
X u 2π/3
SLN
n-2 n-1 n 1 2 3 4 5 6 7 8 9 10 11 12 13 14 15 16 17 18 19 20 21 22
Y v 2π/3
SLN
n-2 n-1 n 1 2 3 4 5 6 7 8 9 10 11 12 13 14 15 16 17 18 19 20 21 22
Z w (a) MMF OF RESPECTIVE WINDINGS (b) ARRANGEMENT OF ARMATURE WINDINGS (c) MMF DISTRIBUTIONS OF RESPECTIVE SETS OF WINDINGS AT t1

(d) RESULTANT MMF DISTRIBUTION AT t1

(e) MMF DISTRIBUTIONS OF RESPECTIVE SETS OF WINDINGS AT t2

(f) RESULTANT MMF DISTRIBUTION AT t2

(g) MMF DISTRIBUTIONS OF RESPECTIVE SETS OF WINDINGS AT t3

(h) RESULTANT MMF DISTRIBUTION AT t3

PRIOR ART
FIG. 22 (a) MMF OF RESPECTIVE WINDINGS
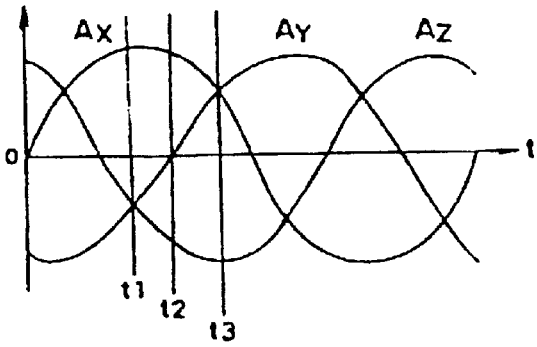
FIG. 22 (b) ARRANGEMENT OF ARMATURE WINDINGS
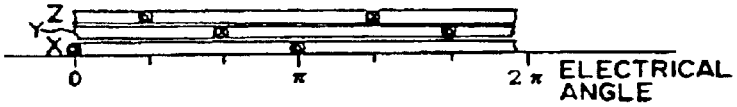
FIG. 22 (c) MMF DISTRIBUTIONS OF RESPECTIVE WINDINGS AT t1
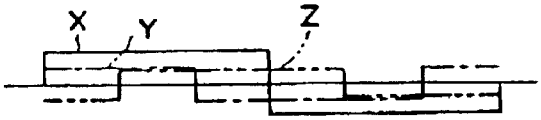
FIG. 22 (d) RESULTANT MMF DISTRIBUTION AT t1
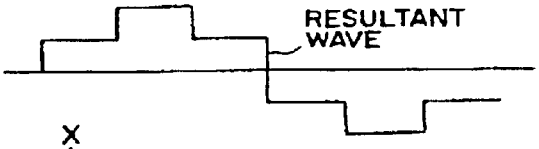
FIG. 22 (e) MMF DISTRIBUTIONS OF RESPECTIVE WINDINGS AT t2
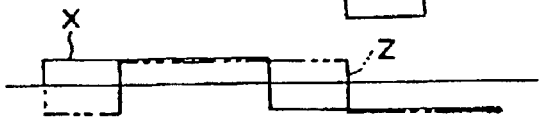
FIG. 22 (f) RESULTANT MMF DISTRIBUTION AT t2
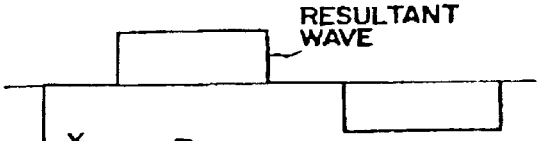
FIG. 22 (g) MMF DISTRIBUTIONS OF RESPECTIVE WINDINGS AT t3
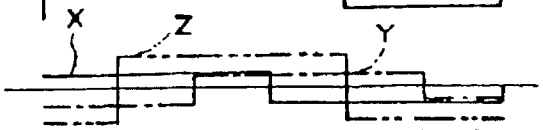
FIG. 22 (h) RESULTANT MMF DISTRIBUTION AT t3
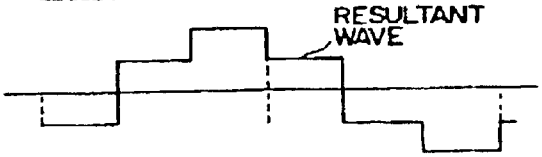

ALTERNATING CURRENT GENERATOR HAVING A PLURALITY OF INDEPENDENT THREE-PHASE WINDINGS

Matter enclosed in heavy brackets [ ] appears in the original patent but forms no part of this reissue specification; matter printed in italics indicates the additions made by reissue.

BACKGROUND OF THE INVENTION

The present invention relates to an alternating current generator having a plurality of sets of armature windings. More particularly, the alternating current generator of the present invention is suitable for use in a vehicle.

There have been used an alternating current (hereinafter referred to as a.c.) generator for a vehicle in which a rotor having field windings is disposed inside a stator having three-phase windings.

In this case, in order to increase the number of poles, a rotor is provided on the outer periphery thereof with a plurality of claw-shaped poles formed on a pair of magnetic cores. The armature of a stator is provided with 3 P slots (grooves) (one slot per phase and per pole) for the number of phases of the windings 3 and the number of poles P. The above-mentioned three-phase windings are disposed in these grooves and a tooth-shaped core is formed between a pair of neighboring slots or grooves.

However, since the a.c. generator for a vehicle having the claw poles has one set of three-phase winding and 3P slots (namely, one slot per phase and per pole), a magnetic flux 104 formed between poles 101 and 102 leaks through a tooth-shaped core 103 between two windings A as shown in FIG. 9a, when the poles 101, 102 of the rotor and the tooth-shaped core 103 of the armature take a relative position as shown in FIG. 8.

Such leakage of magnetic flux not only reduces the effective magnetic flux which contributes to electric power generation, but also generates pulsating magnetic flux.

Accordingly, this causes a magnetic noise to be increased, a generated voltage to fluctuate and an output waveform to be distorted, giving rise to ripples when a generated output is rectified into a direct current (hereinafter referred to as d.c.).

It has been demanded that such a magnetic noise is reduced all the more in a power source for a vehicle, etc. which power source feeds various electrical equipment utilizing electronic components and ICs. Further, a high quality direct current power source having less noise and voltage fluctuation due to a ripple, etc. is demanded.

SUMMARY OF THE INVENTION

It is an object of the present invention is provide an a.c. generator, in which a magnetic noise is reduced and which generates a d.c. rectified output having a stabilized voltage, by reducing leakage magnetic flux occurring in an a.c. generator.

The inventors have found that it is useful to increase magnetic resistance of a magnetic path for the leakage magnetic flux 104 in order to decrease the leakage of magnetic flux and further that it is useful to split the tooth-shaped core 103 between the slots as shown in FIG. 9b. The inventors have found further that the leaked magnetic flux 104' can be utilized as effective magnetic flux interlinked with windings by inserting separate armature windings A' in the slots formed in the split tooth-shaped cores as shown in FIG. 9c and that a resultant rectified output can be stabilized.

Based on the findings, there is provided an alternating current generator comprising a rotatably supported field rotor having a pair of opposed rotor pole cores, each being provided with P/2 claw poles wherein P is an even number; an armature core located around the outer periphery of the field rotor and having axially extending 3nP slots wherein n is an integer more than one; n independent sets of three-phase windings, each being wound on the armature core by being inserted in the slots so that the n sets of three-phase windings are shifted from each other by electrical angle of $\pi/(3n)$ radians; and three-phase rectifiers connected with the n sets of three-phase windings to rectify output voltages generated by the three-phase windings.

In a preferred embodiment of the present invention, each of the claw poles has a trapezoidal peripheral shape and P=12 and n=2 hold, so that the armature core has 72 slots and has first and second sets of three-phase windings wound thereon.

In accordance with the present invention, less magnetic flux flows between adjacent field poles through the same tooth-shaped core, and a period of time during which magnetic flux leaks through the tooth-shaped core is shortened. Accordingly, an amount of reduction in effective magnetic flux for the windings of a stator caused by the leakage magnetic flux decreases, which makes pulsation of magnetic flux difficult to occur. Hence, the fluctuation of a generated voltage and the distortion of an output waveform are reduced, resulting in stabilization of a d.c. rectified voltage.

It is another object of the present invention to reduce a windage noise generated by coil ends of armature windings and also to suppress excessively close assembly of the coil ends.

To accomplish this object, in accordance with the present invention, first and second sets of three-phase windings are inserted in odd and even numbered slots of the armature core, respectively, and center portions of the coil ends of each planes of the first and second sets of three-phase windings projecting on both sides of the armature core are arranged with a pitch pattern of 1, 2, 2, 3, 2, 2 time as large as a unit pitch in a peripheral direction of the armature core.

In such an arrangement, excessive congregation of the coil ends can be prevented so that necessity of forced bending and radial or axial overhang of the coil ends for avoiding such excessive congregation of the coil ends can be decreased. Since the dispersion of the coil ends in a peripheral direction is uniformed, the level of a noise (a fan noise) at a given audio frequency can be reduced. Since the coil ends are disposed with unequal pitches in a peripheral direction of the armature core, the frequency spectrum of the fan noise becomes broader as compared with a case in which the coil ends are arranged with an equal pitch, and, since the auditory sensitivity at the reference frequency is shifted to a lower frequency region, it becomes possible to reduce the level of an acoustic noise.

It is a further object of the present invention to suppress a magnetic noise and also to reduce the ripple content of a direct current produced by rectifying an a.c. voltage.

In order to serve this purpose, both sets of three-phase windings inserted in the above-mentioned 3nP slots are connected in Y-form, each set of three-phase windings is connected with each independent three-phase rectifier, and d.c. output terminals of respective three-phase rectifiers are connected in parallel with each other.

With the above-described configuration, it is possible to effectively reduce leakage magnetic flux and also to reduce the ripple content of a d.c. output by virtue of a phase shift between the output voltage of respective sets of three-phase windings by a predetermined amount.

It is a still further object of the present invention to reduce an electromagnetic noise and the number of rectifiers by shifting the distribution of a resultant magnetomotive force of each phase of the armature windings with the rotational movement of the rotor.

In order to accomplish this object, two sets of three-phase windings, including a set of Y-connected windings and a set of delta-connected windings, are used. The number of turns of the delta-connected windings is 1.5 to 2.5 times as many as that of the Y-connected windings. The two sets of three-phase windings are connected in parallel with each other and are connected to a common three-phase rectifier.

With such an arrangement, the distribution of a resultant magnetomotive force of each phase of the armature windings is shifted maintaining a non-varying shape, so that no large pulsating vibrational force is generated between the rotor and the stator. Therefore, an electromagnetic noise can be reduced, without giving rise to degradation of output performance and a rise in cost and in size of a product. Furthermore, no unbalanced circulating current is generated between the two sets of three-phase windings, so that both sets of three-phase windings can be connected in parallel with each other and further can be connected to a common three-phase rectifier.

BRIEF DESCRIPTION OF THE DRAWINGS

FIGS. 17 through 20 are diagrams showing a fourth embodiment in detail;

FIG. 17 is a circuit diagram showing the connection of the armature windings of the third and fourth embodiments;

FIG. 19 is a side view showing the magnetic poles of a rotor;

FIGS. 20a, 20b, 20c, 20d, 20e, 20f, 20g, and 20h are explanatory views showing the distribution of the air gap magnetomotive force of the armature windings of each phase;

FIGS. 22a, 22b, 22c, 22d, 22f, 22g, and 22h are explanatory views showing the distribution of the air gap magnetomotive force of the armature windings of each phase of a prior art three-phase a.c. generator.

DESCRIPTION OF THE PREFERRED EMBODIMENTS

An a.c. generator for a vehicle proposed by the present invention will now be described with reference to the embodiments of the present invention.

Figure 1:
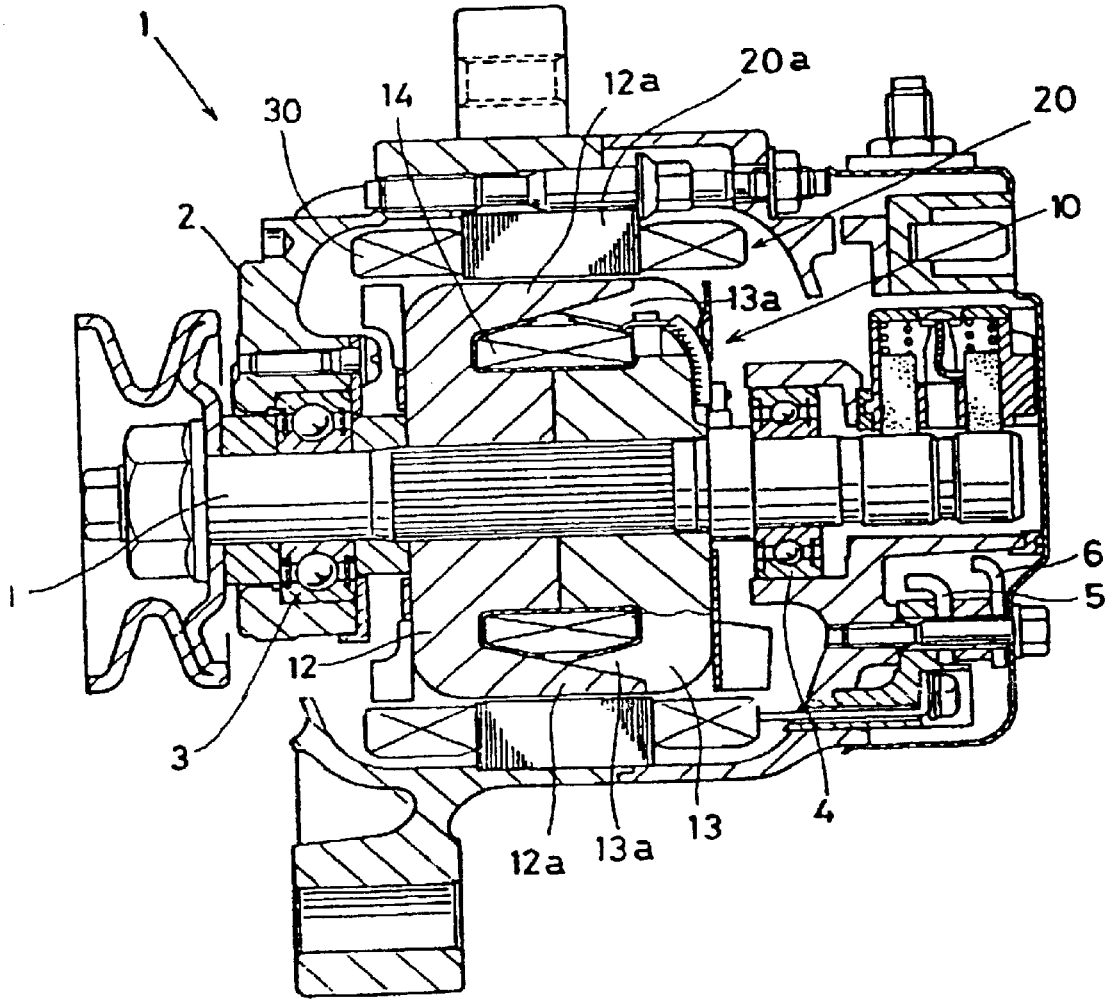
FIG. 1 is a sectional view showing an embodiment of an alternator of the present invention.

FIG. 1 shows an alternator 1 of the present embodiment. A rotor 10 is supported rotatably within a frame 2 by bearings 3, 4 so that it is rotatable relative to the frame 2. A substantially cylindrical armature (stator) 20 is disposed outside the rotor 10 so that it surrounds the rotor 10.

Figure 2:
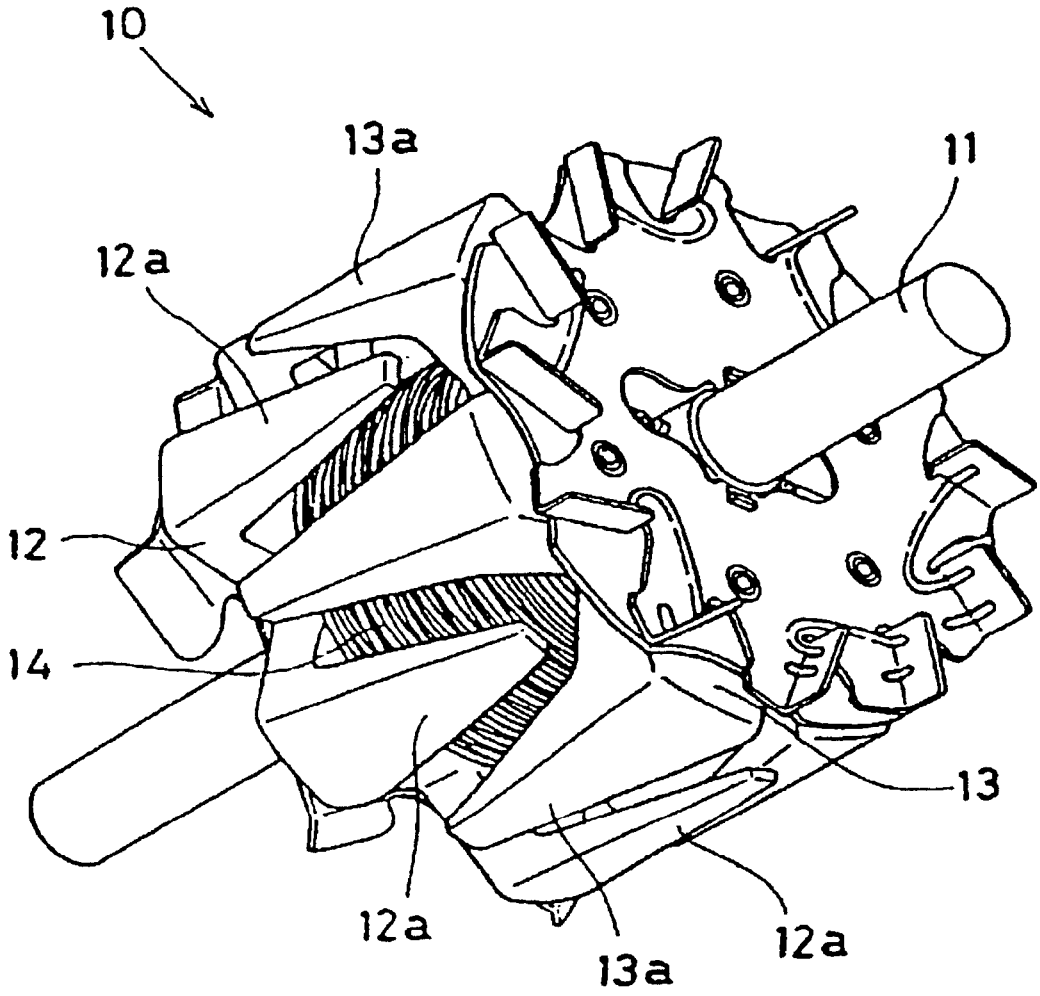
FIG. 2 is a perspective view showing a rotor in the present embodiment.

As shown in FIG. 2, the rotor 10 has a rotary shaft 11 which is driven to rotate by an engine (not shown) through a belt (not shown), rotor cores 12, 13 into which the rotary shaft 11 is fitted, and a rotor coil 14 which is wound on the rotor cores 12 and 13 to serve as a magnetic field coil. The rotor cores 12 and 13 are provided with integrally formed claw-shaped magnetic poles 12a and 13a (having a trapezoidal peripheral shape as viewed in the circumferential direction) at the outer peripheral portions thereof, respectively. The rotor cores 12 and 13 comprises 6 magnetic poles 12a and 13a, respectively, and the magnetic poles 12a and 13a are alternately disposed along the outer periphery of the rotor 10.

Figure 3:
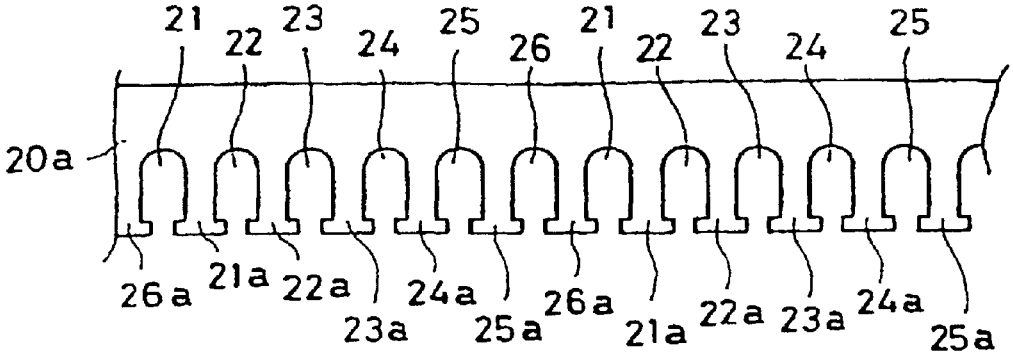
FIG. 3 is a lateral development view showing an armature core in the present embodiment.

The armature 20 has an armature core 20a, as shown in FIG. 3, which is formed to have a substantially cylindrical shape by laminating plate cores obtained by stamping to form tooth-shaped cores 21a through 26a and slots 21 through 26 disposed therebetween, and armature coils 30, with one inserted in each one of the slots 21 through 26.

Figure 4:
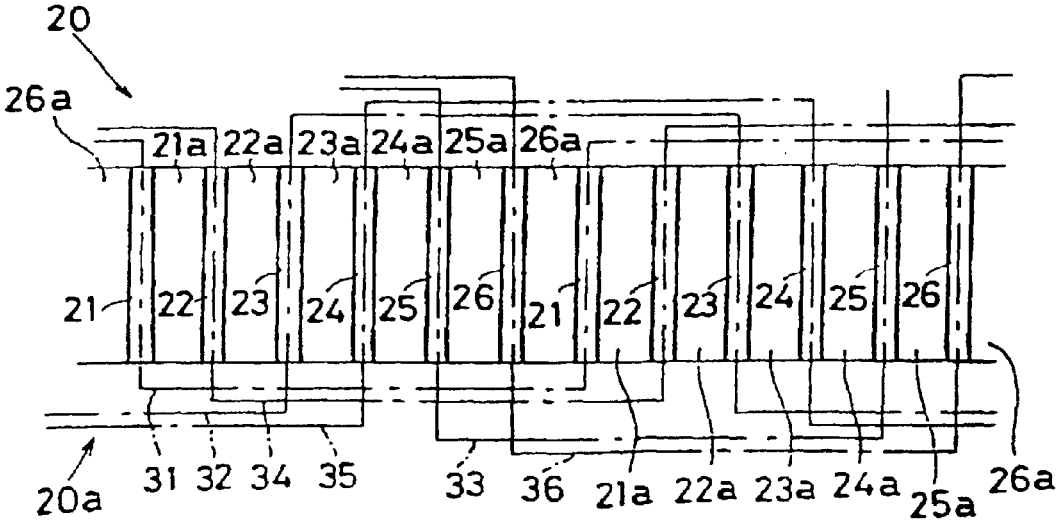
FIG. 4 is a schematic diagram illustrating an armature.

In the present embodiment, the armature core 20a is provided with 72 slots and 72 tooth-like cores so that two sets of three-phase alternating currents are obtained by 12 magnetic poles of the rotor 10. As shown in FIG. 4, as the armature coil 30, three-phase primary coils 31, 32 and 33 an three-phase subsidiary coils 34, 35 and 36 are disposed within the slots 21, 23 and 25 and the slots 22, 24 and 26, respectively to provide a phase difference of electrical angle 60° with each other. Each of the subsidiary coils 34, 35 and 36 are disposed relative to each of primary coils 31, 32 and 33 to provide a phase difference of electrical angle 30°.

Figure 5:
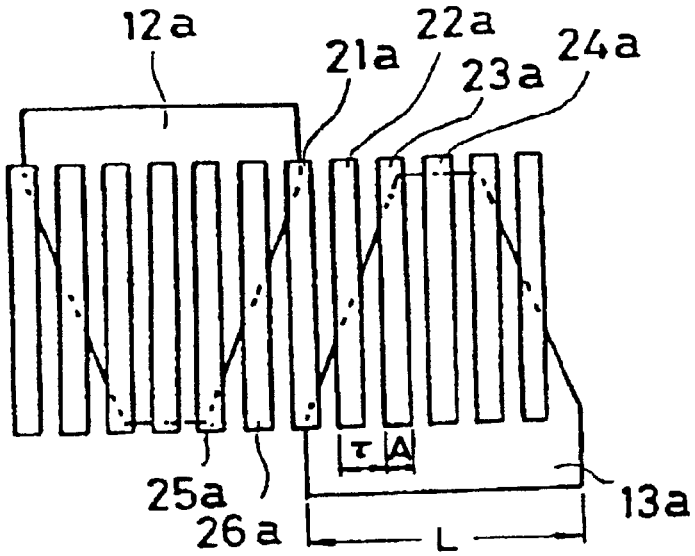
FIG. 5 is a planar development view illustrating the relation between the armature and the magnetic poles.

FIG. 5 is a planar development view showing the relative positions of the tooth-shaped cores 21a and the magnetic poles 12a, 13a of the rotor 10.

In such an arrangement, even when the tooth-like core 21a simultaneously overlaps with the magnetic poles 12a and 13a of the rotor 10 as shown in FIG. 5, the overlap of the tooth-like core 21a with each of the magnetic poles 12a and 13a is very small. In order to reduce the overlapping portion, it is desirable to reduce the length L of the base side of each of the trapezoidal magnetic poles 12a and 13a to be smaller than 7τ−A, where & denotes a slot pitch and A denotes the peripheral width of a tip end of each tooth-shaped core.

Therefore, magnetic flux formed between the poles 12a and 13a through the tooth-like core 21a at this time becomes very little, and the leakage magnetic flux can be suppressed.

As a result, the disturbance in the magnetic flux intersecting each of the primary coils 31 through 33 can be suppressed. Since such leakage magnetic flux in each of the other tooth-like cores 22a through 26a is similarly reduced, the disturbance in the magnetic flux intersecting the subsidiary windings 34 through 36 can be suppressed.

In the alternator 1 of the present embodiment having the above-described structure, the primary coils 31 through 33 and the subsidiary coils 34 through 36 in the armature coil 30 are connected in Y-form and are connected with rectifiers 5 and 6, respectively. The outputs of the rectifiers are supplied to a vehicle battery 7 and a vehicle load 8, and are supplied to a voltage regulator 9 which operates to regulate the vehicle battery at a constant terminal voltage by performing conduction control of the rotor coil 14 in response to the terminal voltage of the vehicle battery.

The thus-constructed alternator 1 generates electric power depending upon the vehicle load 8 when the rotor 10 is driven by an rotating engine.

Figure 7:
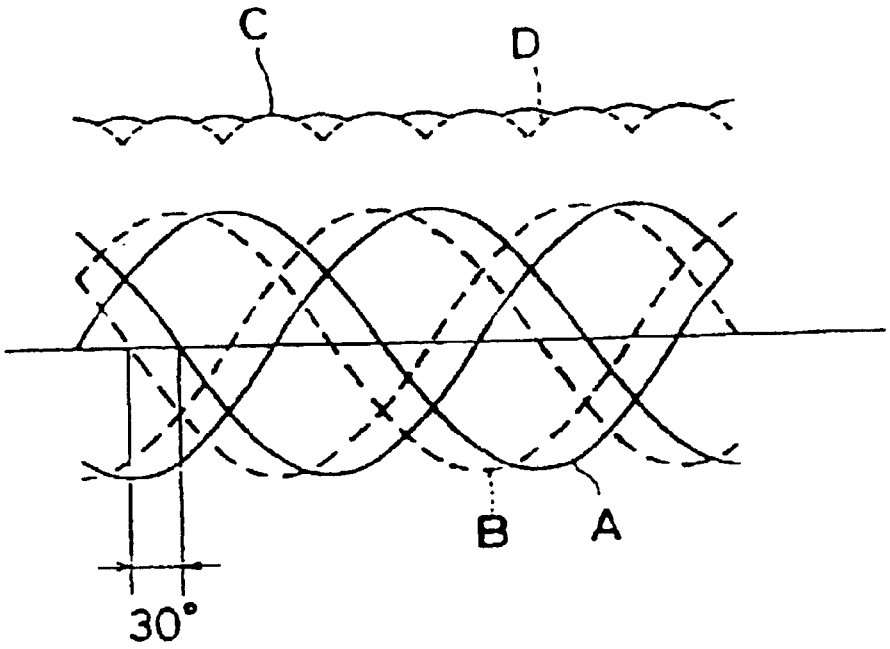
FIG. 7 is a waveform diagram showing the waveform of output voltages of the alternator of the present embodiment.
Figure 6:
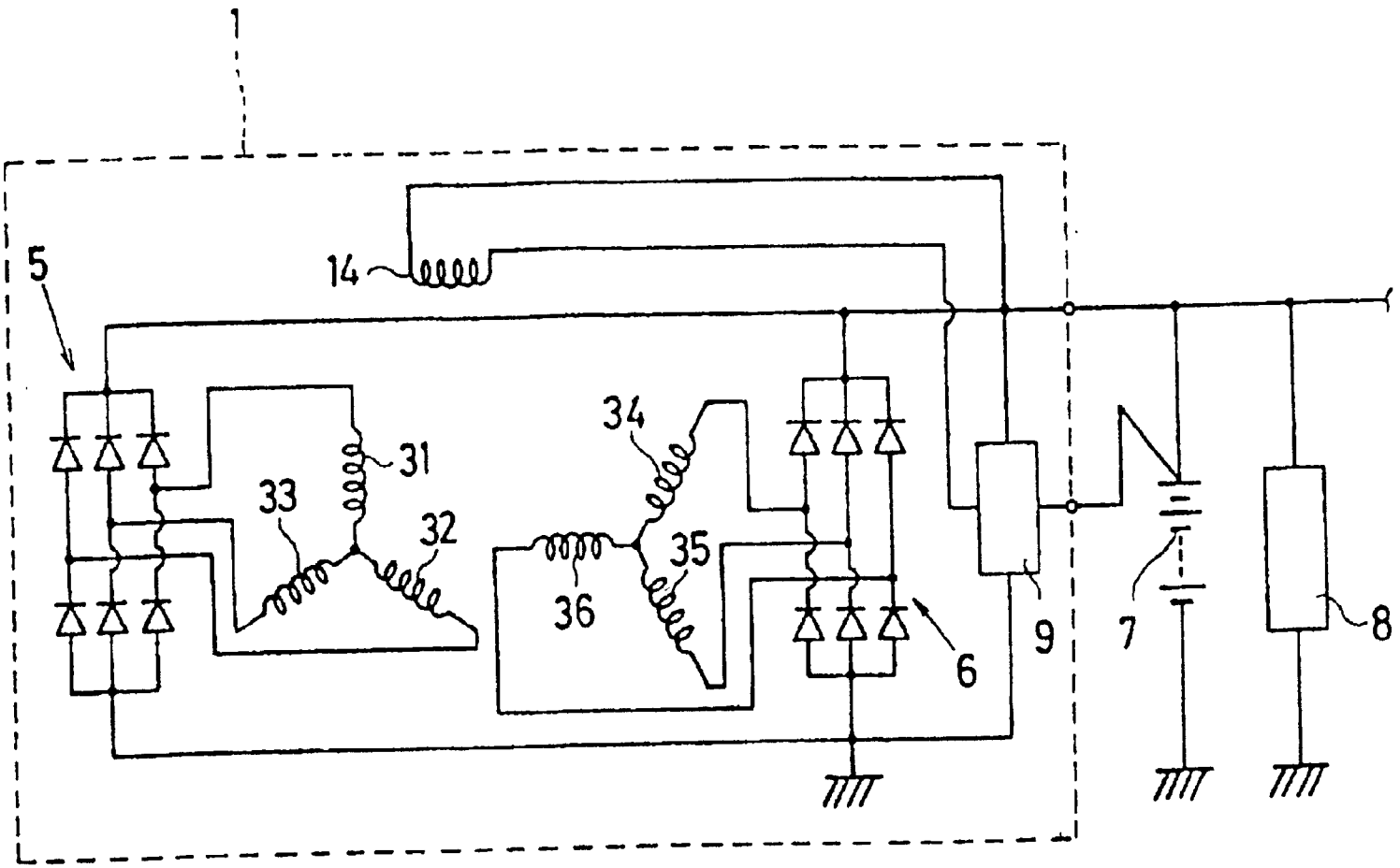
FIG. 6 is a circuit diagram showing a power supply circuit for a vehicle employing the alternator of the present embodiment.
Figure 8:
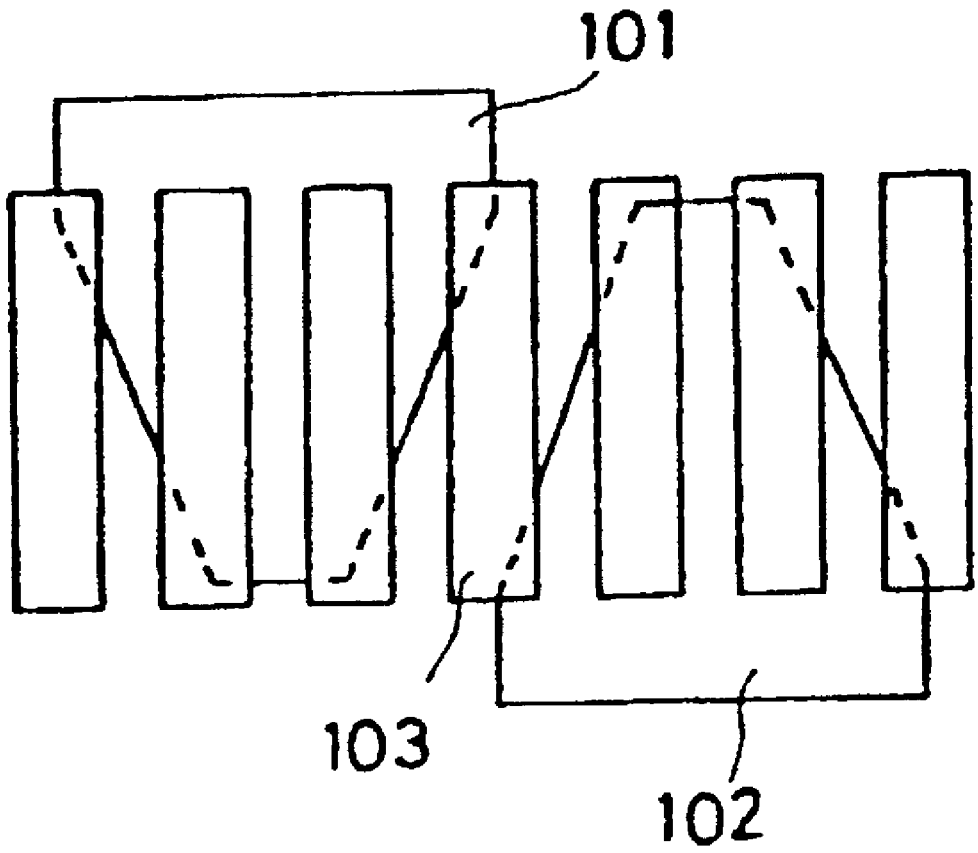
FIG. 8 PRIOR ART
FIG. 8 is a planar development view illustrating the relation between an armature and magnetic poles of the prior art.

At this time, the primary coils 31 through 33 and the subsidiary coils 34 through 36 in the armature coils 30 produce output voltages having waveforms represented by a solid line A and a dotted line B in FIG. 7, respectively. Since the subsidiary coils 34 through 36 are arranged in relation to the primary coils 31 through 33 to have a phase difference of electrical angle 30°, the resultant voltage V which is obtained through three-phase full rectification by the rectifiers 5 and 6 has a waveform represented by a solid line C in FIG. 7.

The resultant voltage V represented by the solid line C has a difference between a maximum voltage and a minimum voltage, that is a ripple, which is smaller than that of a single voltage waveform represented by a dotted line D which is obtained by rectifying the voltage generated only by the primary coils 31 through 33.

The difference Veq ($=V_{max}-V_{min}$) between the maximum voltage $V_{max}$ and the minimum voltage $V_{min}$ is represented as follows:

$$\begin{aligned} Veq &= E\{\sin(2\pi/3) - \sin(-2\pi/3)\} - \\ &\quad E(\sin(\pi/12 + 2\pi/3) - \sin(\pi/12 - 2\pi/3)\} \\ &= E(\sqrt{3} - 1.673) = 0.059E \end{aligned}$$

wherein E denotes a maximum value of a sinusoidal wave generated by the armature coils 30.

The average value $\overline{V}$ of the resultant voltage V is represented as follows:

$$\begin{aligned} \overline{V} &= \frac{1}{\pi/12}\int_0^{\pi/12} \{E\sin(\theta + 2\pi/3) - E\sin(\theta - 2\pi/3)\} \\ &= 1.712E \end{aligned}$$

The ripple factor $Veq/\overline{V}$ is determined as follows:

$$Veq/V=0.034$$

In contrast thereto, a conventional a.c. generator for a vehicle having no auxiliary coil, which is provided with one slot per phase, per pole and is provided with only one set of three-phase coils as the armature coil, produces a resultant voltage V represented by a dotted line D in FIG. 7. In this case, the difference Veq between the maximum value $v_{max}$ and the minimum value $v_{min}$ ($=v_{max}-v_{min}$) is represented as follows:

$$\begin{aligned} Veq &= E(\sin(2\pi/3) - \sin(-2\pi/3)\} - \\ &\quad E(\sin(\pi/6 + 2\pi/3) - \sin(\pi/6 - 2\pi/3)\} \\ &= E(\sqrt{3} - 3/2) = 0.232E \end{aligned}$$

wherein E denotes a maximum value of a sinusoidal wave generated by the armature coils 30.

The average value $\overline{v}$ of the resultant voltage v is represented as follows:

$$\begin{aligned} \overline{v} &= \frac{1}{\pi/6}\int_0^{\pi/6} \{E\sin(\theta + 2\pi/3) - E\sin(\theta - 2\pi/3)\} \\ &= 6/\pi \cdot \sqrt{3}/2 \cdot E \\ &= 1.654E \end{aligned}$$

The ripple factor $veq/\overline{v}$ is determined as follows:

$$veq/v=0.14$$

Accordingly, it is clear that the ripple factor can be remarkably reduced in the present embodiment as compared with that obtained by a conventional generator.

As a result, since the ripple in the rectified output voltage is reduced, a high quality d.c. power supply having less voltage fluctuation can be obtained.

Although the armature windings of the present embodiment are connected in Y-form, they may be connected in delta-form.

Figure 10:
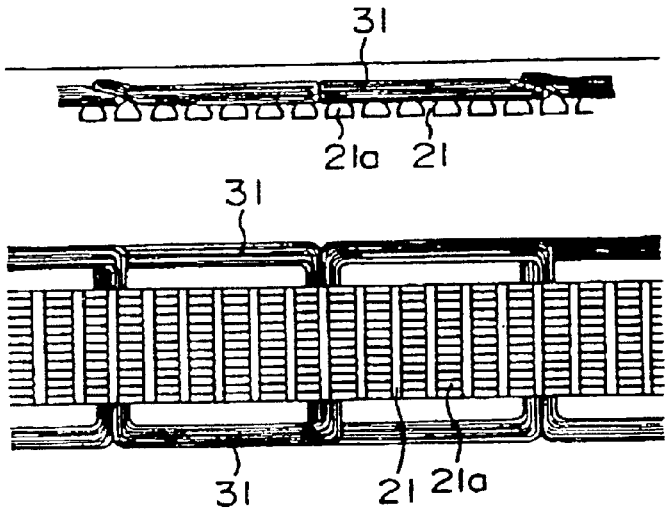
FIG. 10 is a development view of main parts showing another winding system.
Figure 9A:
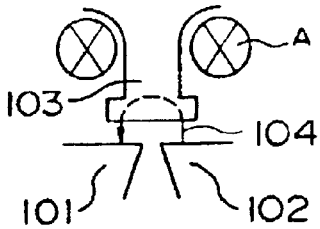
FIGS. 9a, 9b and 9c are explanatory diagrams for explaining the operation and effects of the present invention.
Figure 9B:
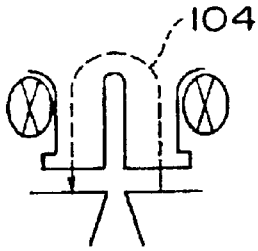
Figure 9C:
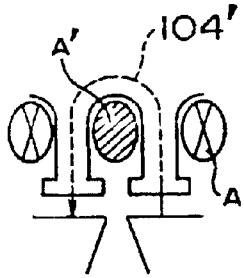

Further, as shown in FIG. 10, a plural number of armature windings may be grouped in one bundle, and the armature windings may be wound in wave-shape and may be wound separated in two layers. In this case, the winding manufacturing operation becomes easier.

A second embodiment of the present invention will be described with reference to FIGS. 11 to 13.

An a.c. generator is generally provided with a cooling fan radially inside of the coil ends of the armature windings projecting on both sides of the armature core (that is, radially inside of the portions of the three-phase armature windings projecting from slots of the armature core) so that the coil ends are forcibly cooled by an air flow produced by the fan.

However, the space between the fan and the coil ends is considerably narrow, so that the action caused by the air flow pressure generated by the fan upon the narrow space is apt to give rise to a fan noise. In particular, since the coil ends of the armature windings have a concave and convex shape having a predetermined pitch, a noise having a given audio frequency is generated.

It is desired in such a three-phase a.c. generator to prevent excessive congregation of coil ends as far as possible and to make constant the density of the arrangement of the coil ends in a circumferential direction so that forced bending and large projection in a radial or axial direction, for example, may be avoided.

The present embodiment aims at solving these problems and making it possible to reduce a windage noise and excessive congregation of coil ends.

To this end, in the present embodiment, a first set of three-phase armature windings (X, Y and Z phases) and a second set of three-phase armature windings (u, v and w phase) are inserted into odd and even numbered slots, respectively. The spaces between the centers of neighboring coil ends in a peripheral direction are arranged at a pitch pattern of 1, 2, 2, 3, 2, 2 times as large as a unit pitch.

Figure 11:
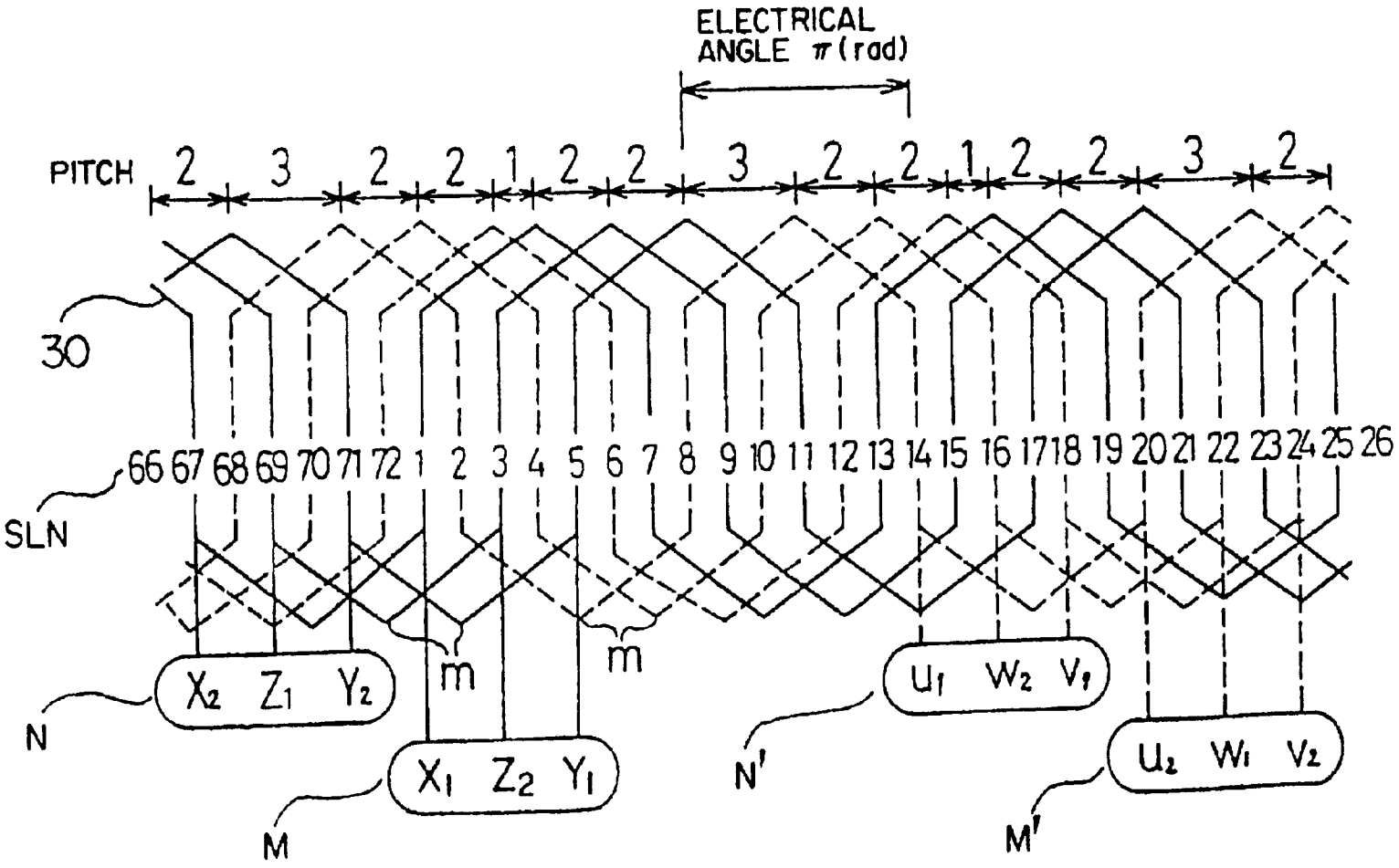
FIG. 11 is a winding diagram showing the armature windings of a second embodiment of the present invention.
Figure 12:
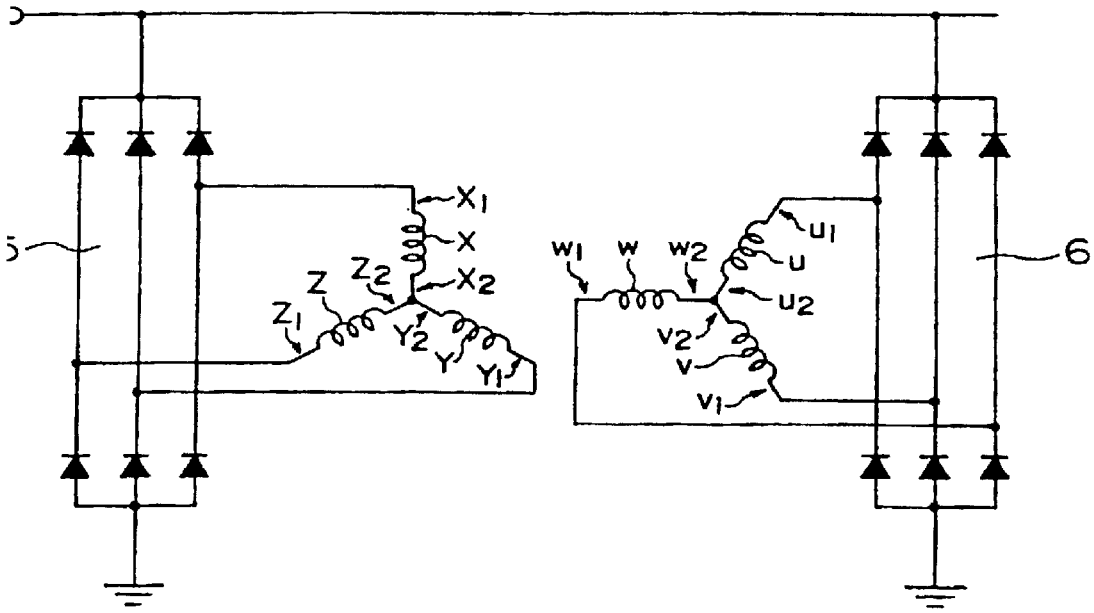
FIG. 12 is a circuit diagram showing the connection of armature windings.
Figure 13:
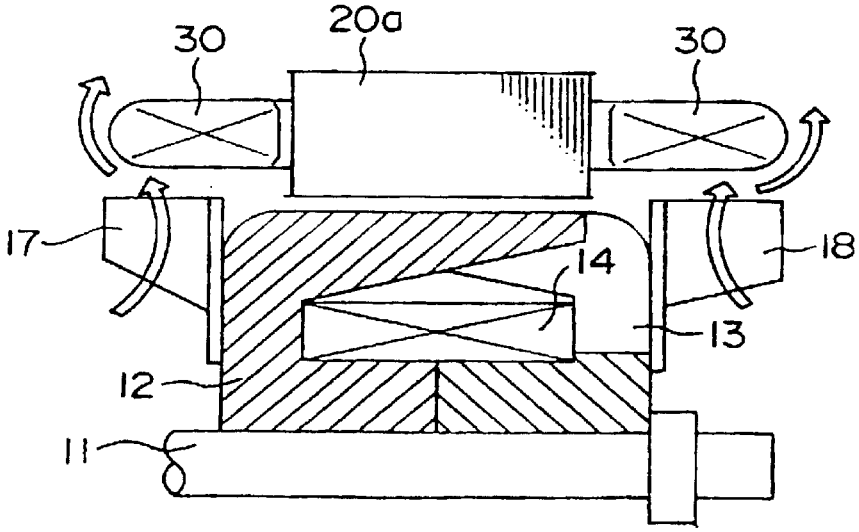
FIG. 13 is a sectional view showing main parts of the generator.

The present embodiment is shown in FIGS. 11 to 13. FIG. 11 is a winding diagram showing the windings of an armature FIG. 12 is a circuit diagram showing the connection of the armature windings, and FIG. 13 is a sectional view showing the main parts of the generator.

The three-phase a.c. generator for a vehicle includes rotor cores 12, 13 having twelve claw poles in total mounted on a rotary shaft 11. The rotor cores 12, 13 have centrifugal fans 17, 18 disposed at opposite ends thereof. The rotor cores 12, 13 are rotatably supported inside the armature core 20a. Coil ends of the three-phase armature windings 30 protrude in both axial directions from the armature core 20a. The armature core 20a has 72 slots (indicated by reference numerals SLN 1 through 72). Therefore, one slot space interval between adjacent slots corresponds to electrical angle 30°.

As shown in FIG. 12, the three-phase armature windings 30 include a first set of three-phase armature windings (X, Y, Z) and a second set of three-phase armature windings (u, v, w) which are connected in Y-form and are connected with independent three-phase full wave rectifiers 5 and 6, respectively.

The three-phase armature windings (X, Y, Z) and (u, v, w) are wound with full pitch in the order of X, −u, Z, −w, Y, −v, −X, u, −Z, w, −Y and v, as shown in FIG. 11. Here, the symbol, "−" designates a direction of a winding from the lower to upper side as viewed in the drawing. References M, M' and N, N' represent winding starting and ending terminal groups, respectively.

Accordingly, a voltage induced in each phase winding of the second set of three-phase armature windings (u, v, w) which are inserted in the even numbered slots (which may be, of course, odd numbered slots depending upon the numbering of the slots) has a phase shift of electrical angle 30° from that of a given phase winding of the first set of three-phase armature windings (X, Y, Z) inserted in the odd numbered slots (the even number and the odd number may be interchanged depending upon selection of the numbering of the slots).

If the windings are distributed in such a manner, the spaces between the centers m, m of two coil ends, which are arranged adjacent to each other in a peripheral direction, are arranged with a pitch pattern of 1, 2, 2, 3, 2, 2 times as large as a unit pitch. In this case, one unit pitch is assumed as one slot interval.

Figure 14:
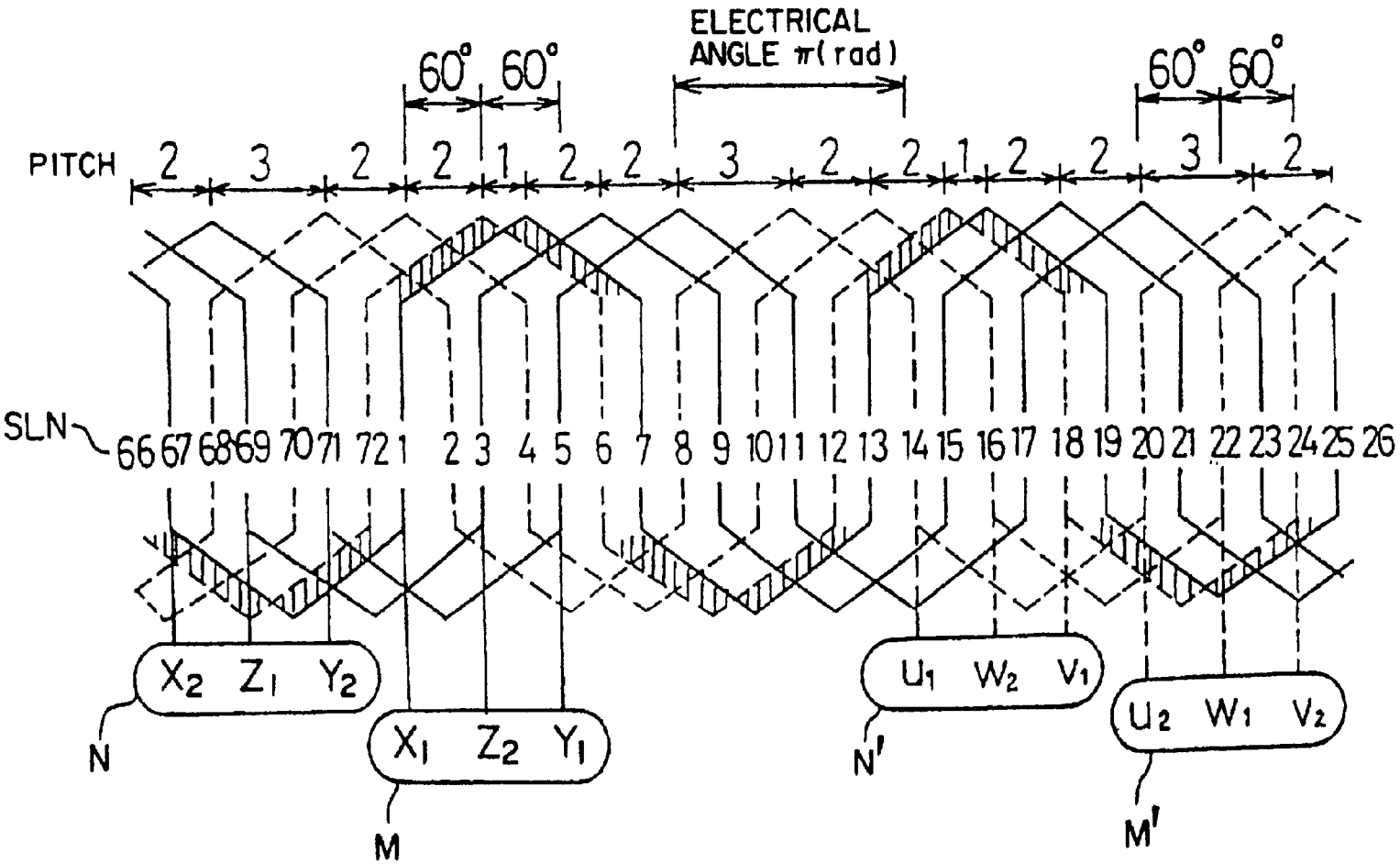
FIG. 14 is a winding diagram for the armature windings showing a state of congregation of the coil ends according to the winding system of the second embodiment.

As mentioned above, in the three-phase a.c. generator of this second embodiment, as shown in FIGS. 11 and 14, respective phase windings (X, Y, Z, u, v, w) are arranged in the order of X, −u, Z, −w, Y, −v, −X, u, −Z, w, −Y and v.

Figure 15:
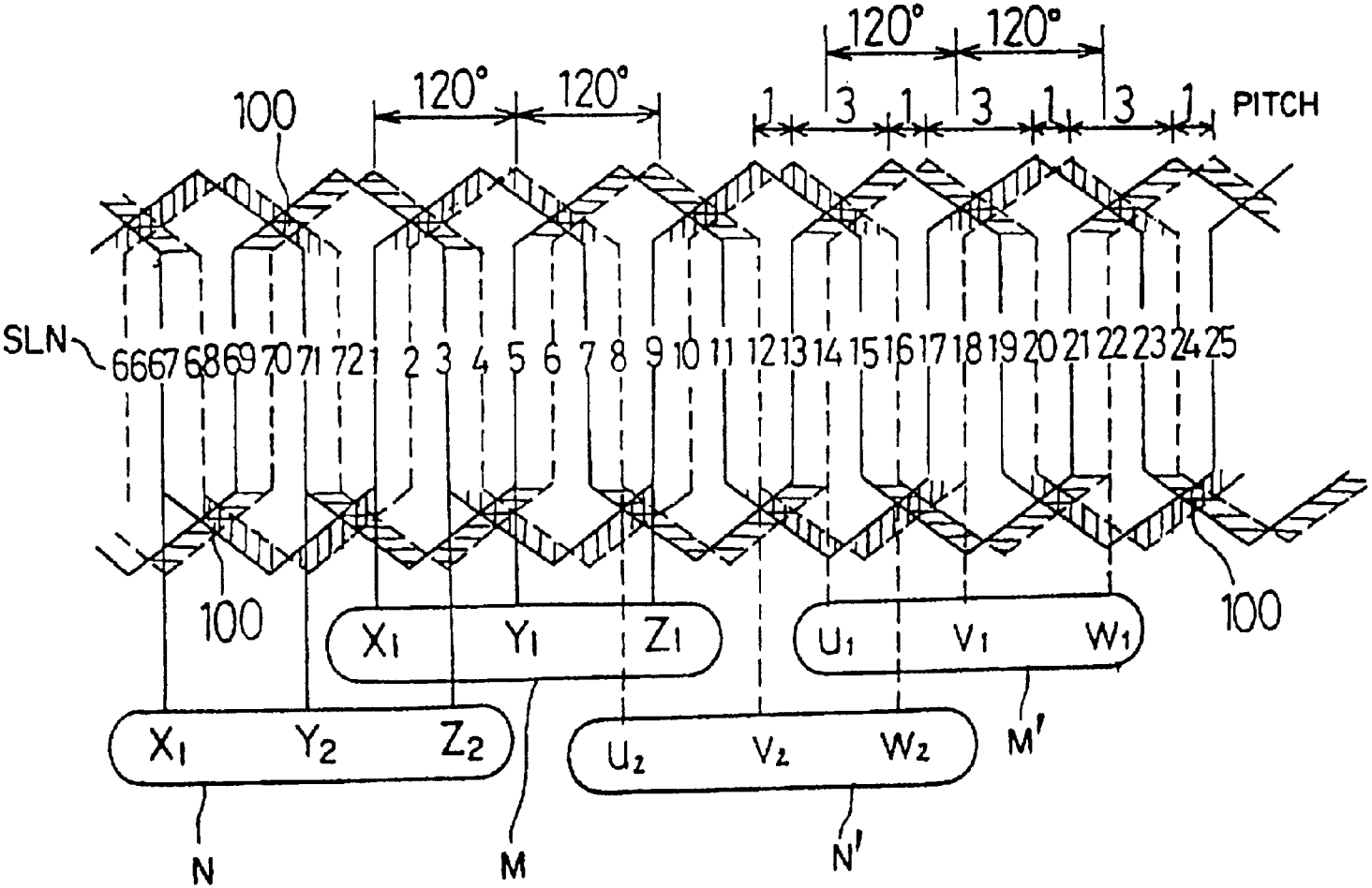
FIG. 15 is a winding diagram for the armature windings showing a state of excessive congregation of the coil ends according to the winding system in a comparative example.

Accordingly, excessive congregation of coil ends can be reduced as compared with a comparative example illustrated in FIG. 15 in which the phase windings are arranged in the order of X, u, −Z, −w, Y, v, −X, −u, Z, w, −Y and −v.

In FIG. 14, a pair of coil ends extending to the right side after departing upward from the slots 71 and 1 intersect with a pair of coil ends extending to the left side after departing upward from the slots 2 and 4 in the present embodiment of the three-phase a.c. generator shown in FIG. 14. Since the coil ends departing from the slots 2 and 4 are apart from each other by a distance of two slots, excessive congregation of coil ends is more difficult to occur as compared with the comparative example of FIG. 15, and hence the coil end treatment becomes easier.

Since the present embodiment adopts a cooling structure in which centrifugal fans 17, 18 are disposed beneath the coil ends to direct centrifugal air flow to the coil ends as shown in FIG. 13, high cooling efficiency especially at the coil ends may be maintained, while a windage noise, which has been inevitably produced at the coil ends, can be removably reduced. In other words, since positional pitches of the windings are made unequal as mentioned above, the convex and concave states of the coil ends are also made unequal with the aforesaid pitches. Therefore, the frequency components of a noise produced at the concave and convex portions are made to be dispersed and to be lowered in level over the range from a low frequency to a high frequency, so that they arouse no unfavorable feeling to the ear.

Figure 16:
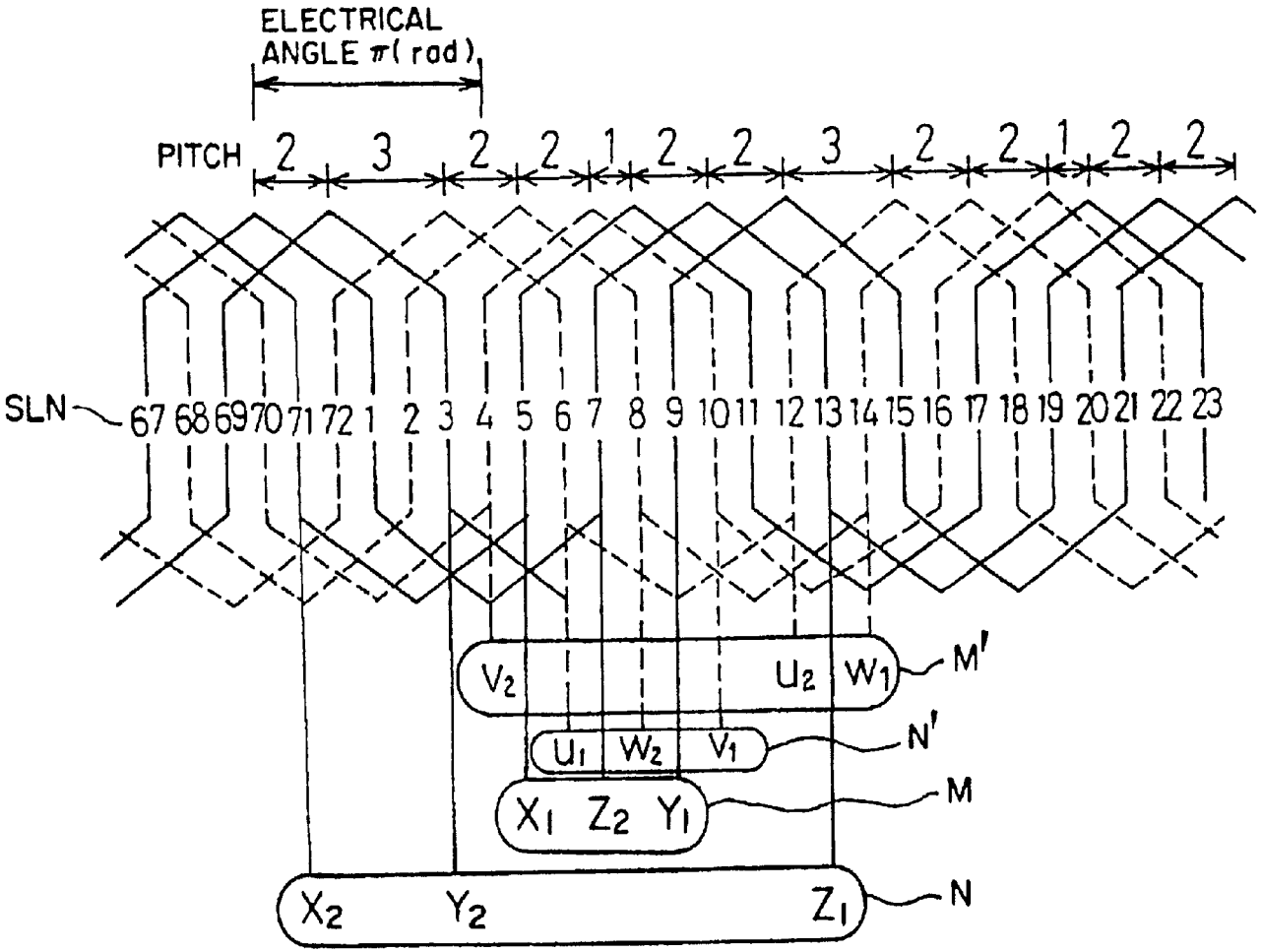
FIG. 16 is a winding diagram showing the armature windings of a third embodiment.
Figure 17:
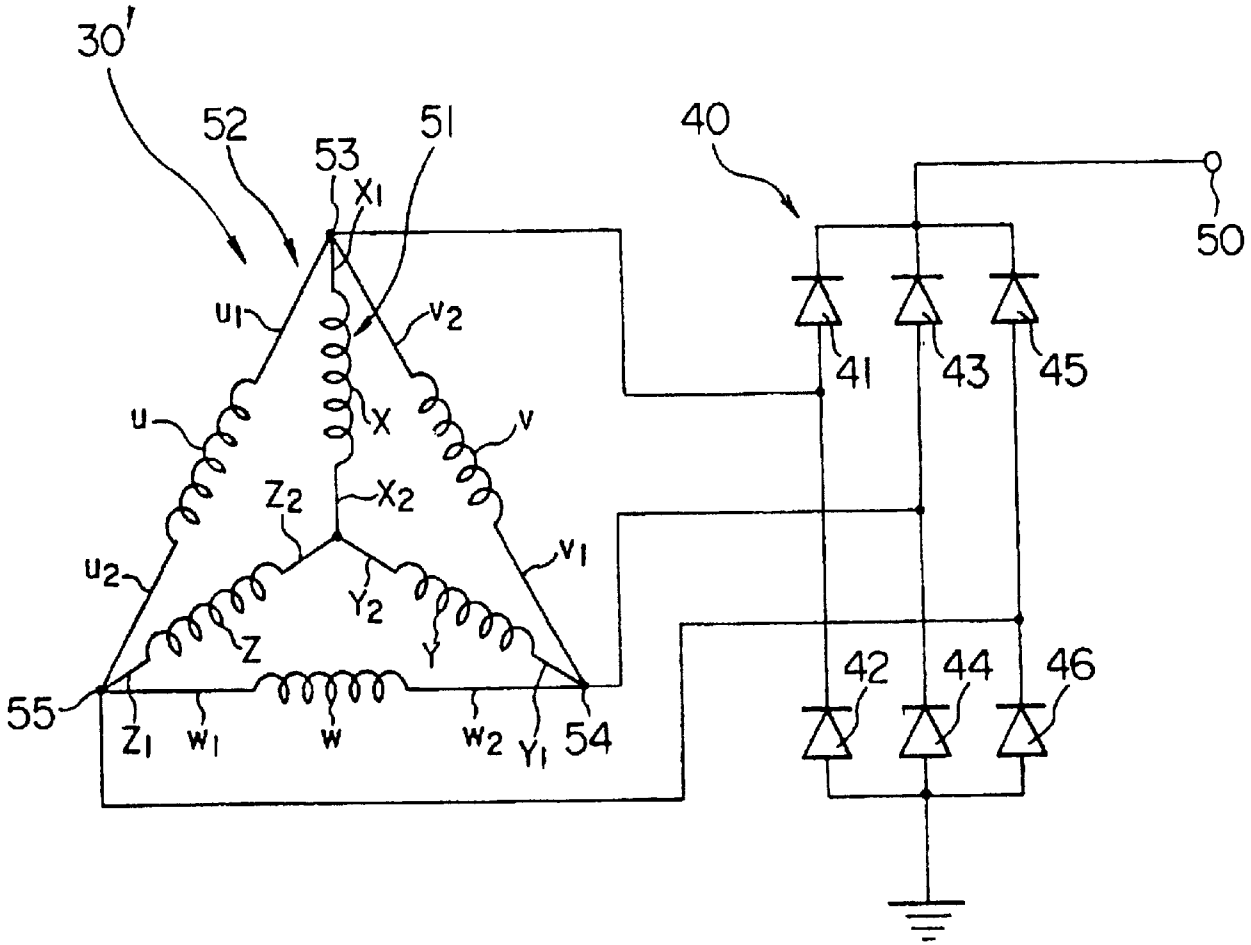

Next, a third embodiment of the present invention is shown in FIGS. 16 and 17. FIG. 16 is a winding diagram showing the armature windings, and FIG. 7 is a circuit diagram showing the connection of the armature windings.

In the present embodiment, a first set of three-phase armature windings (X, Y, Z) are connected in Y-form and a second set of three-phase armature windings (u, v, w) are connected in a delta-form. Respective output terminals of both sets of armature windings are commonly connected with each other and are coupled to a.c. input terminals of a three-phase full wave rectifier 50.

Of course, the ratio of the number of turns of the first set of three-phase armature windings (X, Y, Z) to that of the second set of three-phase armature windings (u, v, w) is present to a given ratio.

However, the phase windings (X, Y, Z, u, v, w) are arranged in the order of X, −u, Z, −w, Y, −v, −X, u, −z, w, −Y and v in the same way as the second embodiment.

The starting terminal groups M, M' (X1, Y1, Z2, u2, v2, w1) and the ending terminal groups N, N' (X2, Y2, Z1, u1, v1, w2) of the two sets of three-phase armature windings are positioned so that the ending terminal Z1 is taken out from the slot 13 which is closest to the terminals u3 and w1 with which the ending terminal Z1 is to be connected for the purpose of easier connection.

A fourth embodiment of the present invention will now be described.

Generally, there have been a three-phase a.c. generators having three-phase armature windings which are connected in Y-form or delta-form and which are wound concentratedly with full pitch on an armature core having three slots per one-pole pitch. With such a type of three-phase a.c. generator, even if a phase current flowing through each phase armature winding X, Y and Z is sinusoidal, the distribution of the air gap magnetomotive force remarkably fluctuates along the circumference of the rotor due to an influence of the third harmonic current contained in the armature current. Accordingly, the distribution of the air gap magnetomotive force is greatly distorted with the movement of a rotor in a rotational direction thereof, and, at the same time, the distribution of the air gap magnetomotive force fluctuates relative to the magnetic poles of the rotor. Therefore, there has been raised a problem that a noise is generated by the magnetic interactive force occurring between the air gap magnetomotive force distribution of the stator and the field magnetomotive force distribution of the rotor.

The reasons therefor will now be analyzed.

FIG. 22(a) shows changes with time of the magnetic motive forces (MMF) of respective windings AX, AY and AZ each of which is the product of the phase current of each of the armature windings X, Y, Z and the number of turns of each of the armature windings X, Y, Z.

In FIG. 22(a), symbols $t_2$ and $t_3$ denote the time points which have elapsed through electrical angle of $\pi/6$ rad from time points $t_1$ and $t_2$, respectively.

The air gap magnetomotive force distributions of respective windings at time points $t_1$, $t_2$ and $t_3$, which are obtained in consideration of the arrangement of the armature windings X, Y and Z shown in FIG. 22(b), are shown in FIGS. 22(c), 22(e) and 22(g), respectively.

Then, the resultant magnetomotive force distributions at time points $t_1$, $t_2$ and $t_3$, which are obtained by synthesizing the air gap magnetomotive force distributions of respective windings, are shown in FIGS. 22(d), 22(f) and 22(h), respectively.

As seen from FIGS. 22(d) and 22(h), the resultant magnetomotive force distribution at time point $t_1$ is identical with that at time point $t_3$ only with an exception that the identical resultant magnetomotive force distribution is shifted in a rotational direction of the rotor through a rotational shift of the rotor (corresponding to electrical angle of $\pi/3$). However, the resultant magnetomotive force distribution at time point $t_2$ is greatly different from the distributions at time points $t_1$ and $t_3$.

Thus, it is supposed that an electromagnetic noise is produced in the above-mentioned three-phase a.c. generator due to the fact that the magnetic interactive force caused by the air gap magnetomotive force distribution of the armature windings of the stator to exert on the field magnetomotive force distribution of the magnetic poles of the rotor fluctuates, as viewed along the circumference of the rotor with the movement of the rotor in a rotational direction thereof.

In order to reduce such an electromagnetic noise, in conventional three-phase a.c. generators, the following approaches have heretofore been adopted.

A sound insulation wall is provided on the outer side of the generator to provide complete insulation from a noise. The shape of magnetic poles of a rotor is changed by providing the magnetic poles of the rotor with convex portions so that the air gap may become nonuniform. The armature windings of the stator are wound distributedly and inserted in multi-slots to make the air gap magnetomotive force distribution of the armature windings sinusoidal. The magnetic poles are skewed or the positions of N and S poles are shifted through one half wave length to make magnetic pulsating forces of the magnetic poles or the armature core cancel each other.

However, these approaches encountered problems such as degradation of output performance due to an increase in magnetic resistance of air gap, etc., rise of cost due to a decrease of the efficiency of assembling work, and an increase in size of product by the provision of a sound insulating wall on the outside of a housing for a three-phase a.c. generator, and so on.

In order to solve the problems, the inventors have found that an electromagnetic noise can be reduced, if the fluctuation of a reactive electromagnetic force applied to the rotor by the stator is decreased by preventing a magnetic interactive force between the field magnetomotive force distribution and the air gap magnetomotive force distribution from being changed with the movement of the rotor in a rotational direction thereof, and, at the same time, have devised a structure of the generator which is able to reduce the number of rectifiers to be used.

In such a structure of the generator, a Y-connected three-phase circuit having three first windings connected in Y-form and a delta-connected three-phase circuit connected in parallel with the Y-connected three-phase circuit and having three second windings, each having the number of turns 1.5 to 2.2 times as many as that of the three first windings, are inserted in a plural number of slots, with a phase shift of electrical angle $\pi/6$ radians provided therebetween.

The reason why the number of turns of the second windings is made 1.5 to 2.2 times as many as that of the first windings is that there is a problem that a circulating current due to an unbalanced electromotive force is generated to give rise to power loss, if a different number of turns other than that mentioned above is adopted.

As a result, third harmonic currents contained in the three first windings, respectively, and third harmonic currents contained in the three second windings, respectively, coincide in phase with each other, since the first windings and the second windings having the number of turns 1.5 to 2.2 times as many as that of the first windings are inserted in the plural number of slots.

Since the first and second windings are inserted in the plurality of slots with a phase shift of electrical angle $\pi/6$ radians provided therebetween, the currents flowing through the first and second windings also have the phase difference of electrical angle of $\pi/6$ radians therebetween.

Accordingly, a comparison of a resultant magnetomotive force distribution at a given time point with that at the other time point which has elapsed through a time corresponding to $\pi/6$ rad shows that the resultant magnetomotive force distribution having one and the same shape has moved through electrical angle $\pi/6$ rad in a rotational direction of the rotor.

Therefore, since the magnetic interactive force between the field magnetomotive force distribution and the air gap magnetomotive force distribution becomes constant irrespective of the position of the rotor in its rotational direction, no large pulsating force is generated between the rotor and the stator. Hence, no large pulsed vibrating force is generated between the rotor and the stator.

Figures 18A, 18B, 18C:
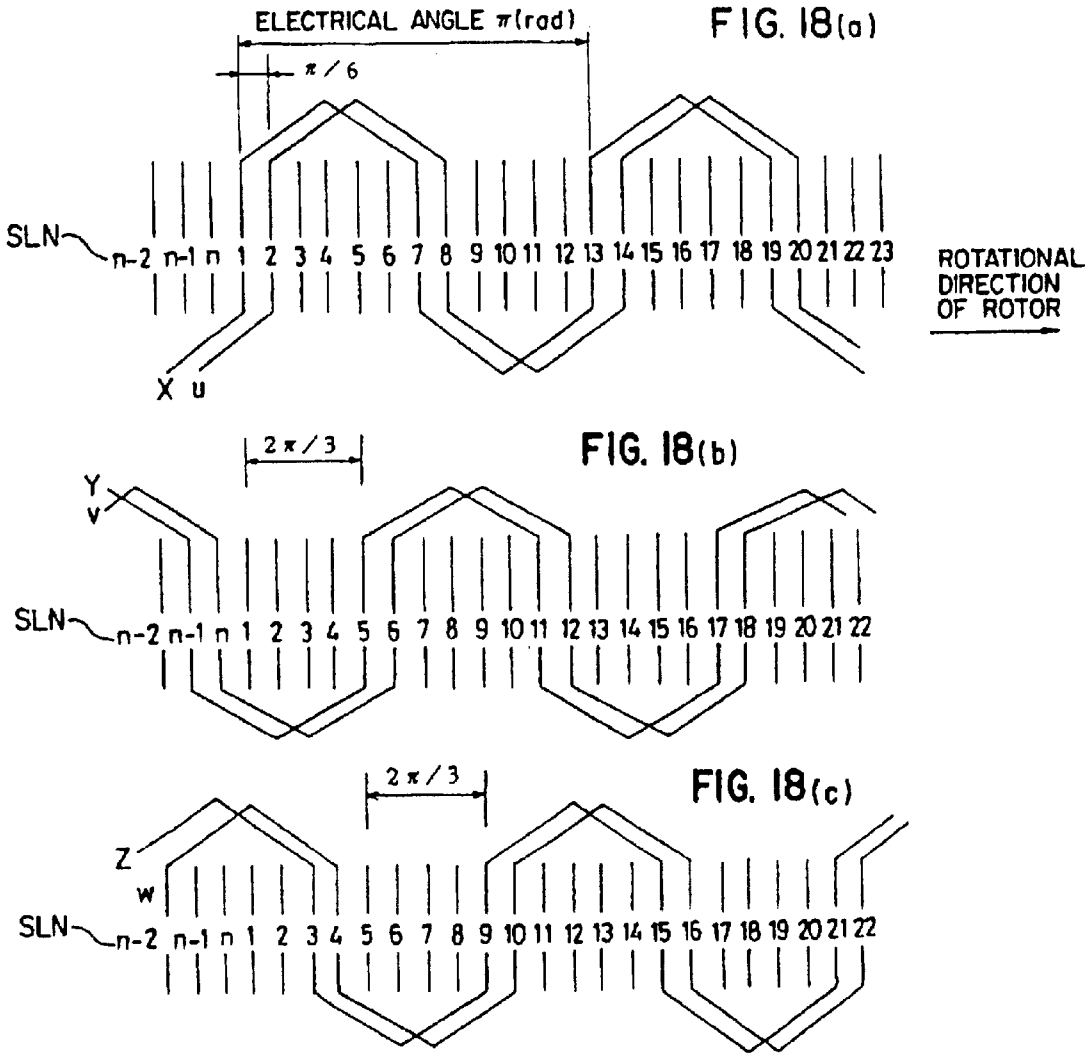
FIGS. 18a, 18b and 18c are winding diagrams showing a development of armature windings of each phase.
Figure 19:
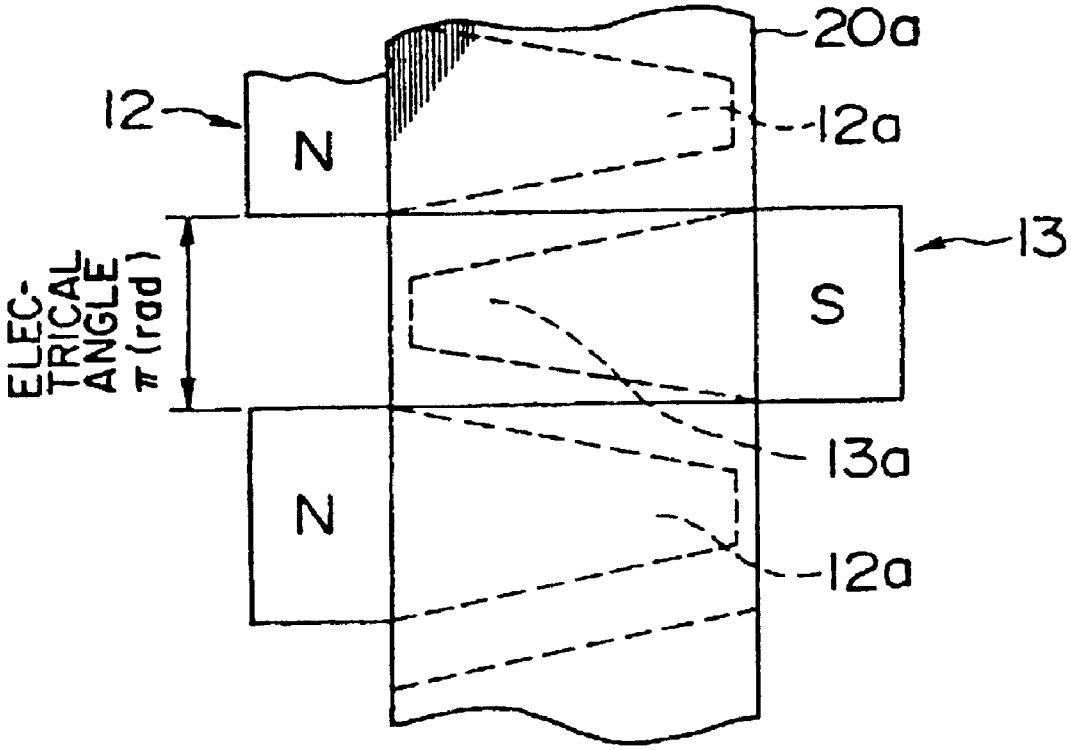
Figure 20:
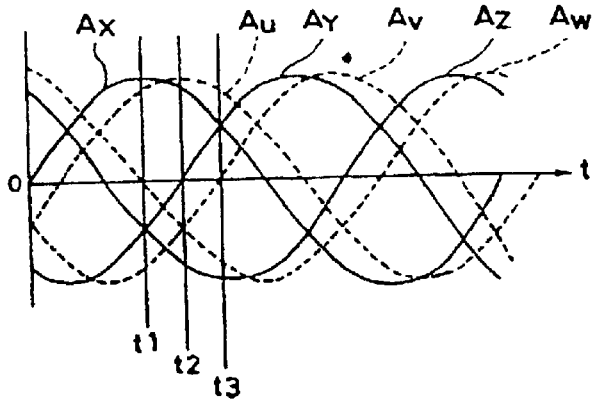
Figure 20:
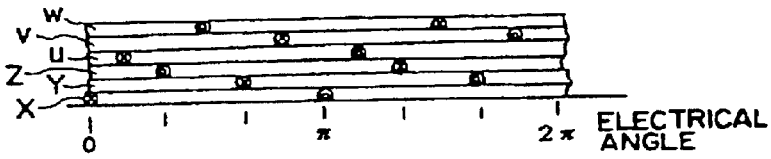
Figure 20:
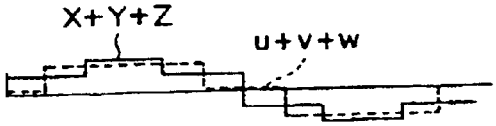
Figure 20:
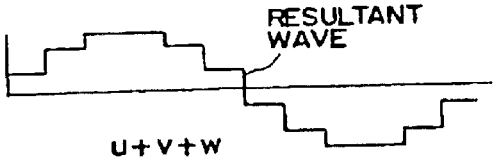
Figure 20:
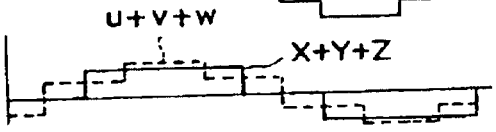
Figure 20:
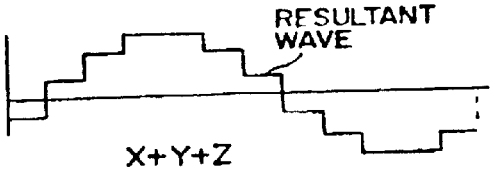
Figure 20:
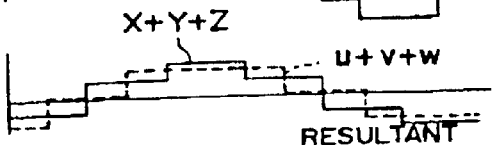
Figure 20:
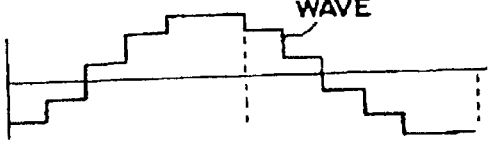

FIGS. 17 and 20 concretely show a fourth embodiment of the present invention. FIG. 17 is a circuit diagram showing the armature coil, FIG. 18 is a view showing a development of armature windings of each phase, and FIG. 19 is a view showing the magnetic poles of the rotor.

The three-phases Y-connected circuit 51 is composed of three first armature windings X, Y, Z which are connected in Y-form to make electromotive forces of the windings have phase differences of $2\pi/3$ from each other. The starting portion of the first armature winding X is connected with the starting portions of the first armature windings Y and Z. The first armature windings X, Y and Z have substantially the same number of turns, and they are wound concentratedly with full pitch in three-phases and are inserted in the slots of the armature core 20a.

The three-phase delta-connected circuit 52 is connected in parallel with the three-phases Y-connected circuit 51 and comprises three second armature windings u, v, w, so that electromotive forces thereof have a phase difference of $2\pi/3$ from each other. The second armature windings u, v, w are wound concentratedly with full pitch in three-phases and are inserted in the slots of the armature core 20a in the same way as the first armature windings X, Y, Z.

The ending portions of the first and second armature windings X and u and the starting portion of the second armature winding v are connected with each other at one point to form a first terminal 53 for the two sets of three-phase windings. The ending portion of the first and second armature windings Y and v and the starting portion of the second armature winding w are connected with each other at one point to form a second terminal 54 for the two sets of three-phase windings. The ending portions of the first and second armature windings Z and w and the starting portion of the second armature winding u are connected at one point to form a third terminal 55 for the two sets of three-phase windings.

The second armature windings u, v, w have substantially the same number of turns, which is $\sqrt{3}$ times as many as that of the first armature winding X, Y, Z. The wire diameter of the second armature windings u, v, w is substantially $1/\sqrt{3}$ times as large as that of the first armature windings X, Y and Z. Accordingly, the total sectional area of the windings inserted in each slot of the armature core 20a are substantially equal to each other.

Referring to FIG. 18, the armature core 20a is provided with 12 slots per two pole pitches on the inner peripheral surface thereof opposite to the rotor 10. That is, the armature core of this embodiment has slots twice as many as those of an armature core of a usual a.c. generator having concentrated three-phase full pitch windings. The two pole pitches are a quotient of the division of the inner peripheral surface of the armature core by the number of magnetic poles, which quotient corresponds to electrical angle $2\pi$ rad.

As mentioned above, the first and second armature windings X, Y, Z and u, v, w are inserted in the slots so that the second armature windings are shifted from the first armature windings by electrical angle $\pi/6$ rad (=30°) in a rotational direction of the rotor.

In FIG. 19, the rotor cores 12 and 13 have substantially trapezoidal-shaped (Lundell type) claw poles and are supported inside the armature core 20a to be opposite to the inner peripheral surface of the armature core and to be apart therefrom through an air gap which is, for example, about 0.35 mm. When the field winding 14 is energized, all the claw poles 21a become N poles and all the claw poles 13a becomes S poles. Since each of the claw poles 12a is disposed between the other two claw poles 13a, twelve N and S poles are disposed alternately along the outer periphery of the rotor cores 12, 13.

In FIG. 17, the three-phase full wave rectifying circuit 40 is composed of six diodes 41 through 46 and is connected with the first terminal 53, the second terminal 54 and the third terinal 55 at the junction points of the two sets of three-phase windings to rectify the a.c. currents generated in the three-phase Y-connected circuit 52 and the three-phase delta-connected circuit 52. The output of the three-phase full wave rectifying circuit 40 is supplied to electrical apparatuses and a power source battery via an output terminal 50.

The operation of the three-phase a.c. generator of the present embodiment will be described with reference to FIG. 20. FIG. 20 is a drawing showing the air gap magnetomotive force distribution of; the first and second armature windings X, Y, Z and u, v, w, respectively.

FIG. 20(a) shows the change with time of the magnetomotive forces (MMF) AX, AY, AZ, Au, Av, Az of respective windings, each of which is a product of the phase current of each of the armature windings X, Y, Z, u, v, w and the number of turns of each of the armature windings X, Y, Z, u, v, w.

By the combined consideration of the air gap magnetomotive forces of respective windings at time points $t_1$, $t_2$ and $t_3$ shown in FIG. 20(a) and the arrangement of the armature windings X, Y, Z, u, v, w shown in FIG. 20(b), the air gap magnetomotive force distributions of respective sets of windings at time points $t_1$, $t_2$ and $t_3$ are obtained as shown in FIGS. 20(c), 20(e) and 20(g). The resultant magnetomotive force distributions, which are obtained by synthesizing the air gap magnetomotive force distributions of respective sets of windings, have the same waveform at time points $t_1$, $t_2$ and $t_3$, as shown in FIGS. 20(d), 20(f) and 20(h), and thus they have a stationary wave relationship with respect to the magnetic poles 12a, 13a of the rotor.

That is, if the reaction system of the first and second armature windings X, Y, Z, and u, v, w is shifted by electrical angle $\pi/6$ rad and the magnetic poles 12a and 13a of the rotor are rotated in a rotational direction through the same electrical angle, the resultant magnetomotive force distribution is obtained always by synthesizing the distributions shown in FIGS. 20(d) and 20(f). Therefore, even when the rotor and the resultant magnetomotive force distribution are moved in a rotational direction passing the time points $t_1$, $t_2$ and $t_3$, the shape of the resultant magnetomotive force distribution does not change even after the air gap magnetomotive force of the armature has been subjected to the reaction by the field magnetomotive force of the rotor, so that the resultant magnetomotive force distribution is only shifted with the movement of the rotor in a rotational direction.

Accordingly, since the interactive magnetic force occurring between the field magnetomotive force distribution and the air gap magnetomotive force distribution remains constant irrespective of a rotational position of the magnetic poles 12a and 13a of the rotor, no remarkable pulsation is generated other than a magnetic pulsating force caused by a slight slot ripple occurring at the slot opening.

Thus, since no large pulsed vibrating force is generated between the armature of the rotor, an electromagnetic noise can be reduce without requiring any large scale sound insulating wall or any special countermeasure and without causing the output performance to be deteriorated and the cost and size of a product to become high and large, respectively.

Since the fluctuation of the magnetic flux on the surface of the magnetic poles 12a and 13a of the rotor can be reduced, the output efficiency of the a.c. generator can be elevated due to a remarkable decrease in magnetic resistance. Further, a decrease in heat generation of the magnetic poles 12a and 13a can lower the temperature of the field winding, so that the output efficiency of the a.c. generator can be further improved due to the fact that a stronger exciting force can be utilized.

When a first set of armature windings X, Y, Z and a second set of armature windings u, v, w are inserted in the slots so that they are shifted by $\pi/6$ rad from each other, the output currents from the respective set of armature windings differ in phase from each other. Accordingly, two sets of three-phase full wave rectifying circuits 4 are required for an output load circuit. In order to solve this problem, it is devised to prevent unbalanced circulating currents from being generated by making the ratio of the numbers of turns of the respective windings be $1:\sqrt{3}$, by connecting a Y-connected winding set in parallel with a delta-connected winding set and simultaneously by making the voltage and phase of each corresponding output terminal identical with each other between the respective winding sets. Since an output can be obtained by a single set of three-phase full wave rectifying circuit 40, an inexpensive and compact a.c. generator can be provided.

Since the wire diameter of the first set of armature windings X, Y, Z and that of the second set of armature windings u, v, w are made to have a ratio of $1:1/\sqrt{3}$, the current density does not differ between the two winding sets, so that the utilization efficiency of the wires is not deteriorated. Since the total conductor sectional area of the first and second armature windings X, Y, Z and u, v, w within a slot, which is proportional to the number of turns multiplied by (the wire diameter)2, is substantially the same, the space utilization efficiency of the slot is not deteriorated.

Figure 21:
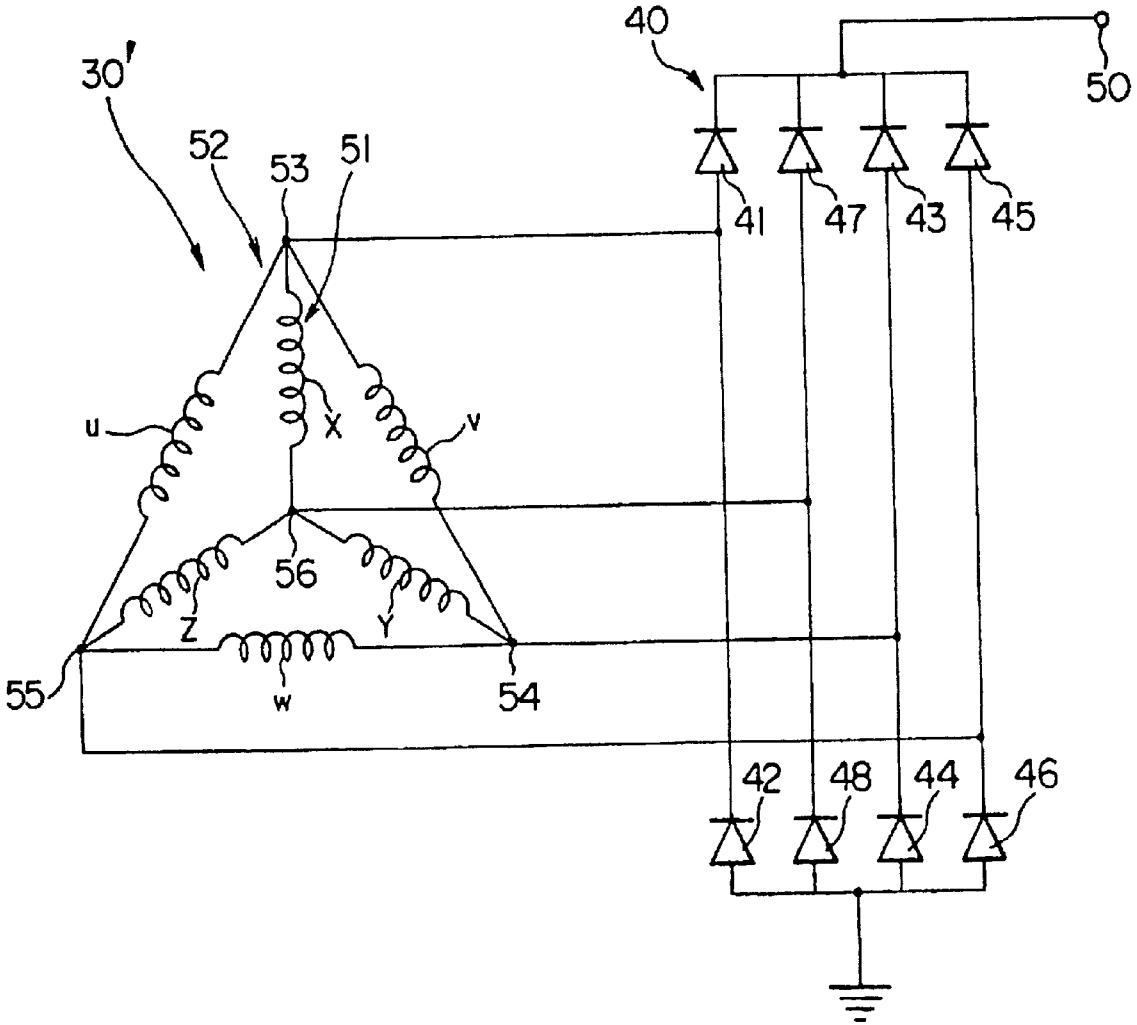
FIG. 21 is a circuit diagram showing the electric circuit of a three-phase a.c. generator of a fifth embodiment of the present invention.

FIG. 21 shows a fifth embodiment of the present invention in which diodes 47 and 48 are connected to a neutral point 56 of the three-phase Y-connected circuit 51. A third harmonic current contained in the output of the three-phase Y-connected circuit 51 is taken out from the neutral point 56.

Although a three-phase full wave rectifying circuit has been used for an output load circuit, a rectifying circuit using a transistor bridge, Zener diodes, etc. may be used.

In the above-described embodiment, the ratio of the numbers of turns of the first and second sets of armature windings has been assumed as $1:\sqrt{3}$. However, it may be in the range of 1:1.5–2.2

We claim:

1. An alternating current generator comprising a rotatably supported field rotor having a pair of opposed rotor pole cores, each being provided with P/2 claw poles wherein P is an even number;

an armature core located around the outer periphery of the field rotor and having axially extending 3nP slots wherein n is an integer more than one;

n independent sets of three-phase windings, each being wound on the armature core by being inserted in the slots so that the n sets of three-phase windings are shifted from each other by an electrical angle of $\pi/(3n)$ radians; and three-phase rectifiers connected with the n sets of three-phase windings to rectify output voltages generated by the three-phase windings.

2. An alternating current generator as set forth in claim 1, in which said claw poles have a trapezoidal peripheral shape and P=12 and n=2 hold so that said armature core has 72 slots and said three-phase windings include first and second three-phase windings.

3. An alternating current generator as set forth in claim 2, in which the length L of the base side of the trapezoidal peripheral shape of said claw poles is less than $7\tau$-A, wherein $\tau$denotes a slot pitch of said armature core and A denotes the peripheral width of a tip end of a tooth portion of said armature core.

4. An alternating current generator as set forth in claim 2, in which said first and second three-phase windings are substantially identical with each other in diameter of the cross-section of a winding conductor, the number of parallel winding conductors, and the number of winding turns.

5. An alternating current generator as set forth in claim 2, in which said first and second three-phase windings of each phase are wave-shaped windings having a plural number of parallel winding conductors.

6. An alternating current generator as set forth in claim 1, in which all the n sets of three-phase windings are connected in Y-form, respectively, and each set of three-phase windings has an independent three-phase rectifier connected thereto, and direct current output terminals of the respective rectifiers are connected in parallel with each other.

7. An alternating current generator as set forth in claim 2, in which all the n sets of three-phase windings are connected in Y-form, respectively, and each set of three-phase windings has an independent three-phase rectifier connected thereto, and direct current output terminals of the respective rectifiers are connected in parallel with each other.

8. An alternating current generator as set forth in claim 1, in which the n sets of three-phase windings are two sets of three-phase windings, with one set being connected in Y-form and the other set being connected in delta-form, and the two sets of three-phase windings are connected in parallel with each other and then connected to a common three-phase rectifier.

9. An alternating current generator as set forth in claim 2, in which the n sets of three-phase windings are two sets of three-phase windings, with one set being connected in Y-form and the other set being connected in delta-form, and the two sets of three-phase windings are connected in parallel with each other and then connected to a common three-phase rectifier.

10. An alternating current generator as set forth in claim 8, in which the number of turns of the delta-connected thee-phase windings is 1.5 to 2.5 times as many as that of the Y-connected three-phase windings.

11. An alternating current generator as set forth in claim 9, in which the number of turns of the delta-connected three-phase windings is 1.5 to 2.5 times as many as that of the Y-connected three-phase windings.

12. An alternating current generator as set forth in claim 2, in which said first and second three-phase windings are inserted in odd and even numbered slots of said armature core, respectively, and center portions of respective coil ends of each phase of said first and second three-phase windings projecting from both sides of said armature core are arranged with a pitch pattern of 1, 2, 2, 3, 2, 2 times as large as a unit pitch in a peripheral direction of said armature core.

13. An alternating current generator comprising:

a frame for defining an accommodation space therein;

a substantially cylindrical armature core rigidly supported in the accommodation space of said frame and having a plurality of slots axially extending along an inner wall thereof;

first and second sets of three-phase windings wound respectively being inserted in said plurality of slots so that the respective sets of three-phase windings are arranged with a phase difference of electrical angle of $\pi/6$ radians therebetween;

a field rotor comprising: a field core having a pair of opposed rotor pole cores and rotatably disposed inside and armature core, each of said rotor pole cores having P/2 claw poles wherein P is an even number; and a field winding wound around said rotor pole cores; and three-phase rectifiers connected with said first and second sets of three-phase windings for rectifying an output generated therefrom, said claw poles having a substantially trapezoidal peripheral shape, and said armature core having 6P slots.

14. An alternating current generator as set forth in claim 13, in which the length L of the base side of the trapezoidal peripheral shape of said claw poles is less than $7\pi$-A, wherein $\pi$ denotes a slot pitch of said armature core and A denotes the peripheral width of a tip end of a tooth portion of said armature core.

15. An alternating current generator as set forth in claim 13, in which both said first and second sets of three-phase windings are connected in Y-form, respectively, and each set of three-phase windings has an independent three-phase rectifier connected thereto, and direct current output terminals of the respective rectifiers are connected in parallel with each other.

16. An alternating current generator as set forth in claim 14, in which both said first and second sets of three-phase windings are connected in Y-form, respectively, and each set of three-phase windings has an independent three-phase rectifier connected thereto, and direct current output terminals of the respective rectifiers are connected in parallel with each other.

17. An alternating current generator as set forth in claim 13, in which one set of three-phase windings is connected in Y-form and the other set being connected in delta-form, and the two sets of three-phase windings are connected in parallel with each other and then connected to a common three-phase rectifier.

18. An alternating current generator as set forth in claim 14, in which one set of three-phase windings is connected in Y-form and the other set being connected in delta-form, and the two sets of three-phase windings are connected in parallel with each other and then connected to a common three-phase rectifier.

19. An alternating current generator as set forth in claim 17, in which the number of turns of the delta-connected three-phase windings is 1.5 to 2.5 times as many as that of the Y-connected three-phase windings.

20. An alternating current generator as set forth in claim 18, in which the number of turns of the delta-connected three-phase windings is 1.5 to 2.5 time as many as that of the Y-connected three-phase windings.

21. An alternating current as set forth in claim 13, in which said first and second sets of three-phase windings are inserted in odd and even numbered slots of said armature core, respectively, and center portions of respective coil ends of each phase of said first and second three-phase windings projecting from both sides of said armature core are arranged with a pitch pattern of 1, 2, 2, 3, 2, 2 times as large as a unit pitch in a peripheral direction of said armature core.

*22. The alternating current generator as claimed in claim 1, wherein the alternating current generator is an alternating current generator for a vehicle.*

*23. The alternating current generator as claimed in claim 22, wherein the alternating current generator for a vehicle is adaptive to be driven by an engine of a vehicle, and wherein the field rotor, the armature core, the three-phase windings and the three-phase rectifiers are adaptive to supply electric power to a vehicle battery and a vehicle load.*

*24. The alternating current generator as claimed in claim 23, wherein the field rotor has a field winding, and wherein the alternating current generator comprises a voltage regulator which preforms conduction control of the field winding in response to the terminal voltage of the vehicle battery to regulate the vehicle battery at a constant terminal voltage.*

*25. The alternating current generator as claimed in claim 1, wherein each of said claw poles has a trapezoidal peripheral shape, and only one tooth portion of said armature core may simultaneously overlap with two of said claw poles.*

*26. The alternating current generator as claimed in claim 13, wherein the alternating current generator is an alternating current generator for a vehicle.*

*27. The alternating current generator as claimed in claim 26, wherein the alternating current generator for a vehicle is adaptive to be driven by an engine of a vehicle, and wherein the field rotor, the armature core, the three-phase windings and the three-phase rectifiers are adaptive to supply electric power to a vehicle pattern and a vehicle load.*

*28. The alternating current generator as claimed in claim 27, wherein the field rotor has a field winding, and wherein the alternating current generator comprises a voltage regulator which performs conduction control of the field winding in response to the terminal voltage of the vehicle battery to regulate the vehicle battery at a constant terminal voltage.*

*29. The alternating current generator as claimed in claim 13, wherein each of said claw poles has a trapezoidal peripheral shape, and only one tooth portion of said armature core may simultaneously overlap with two of said claw poles.*

* * * * *